Jan. 2, 1951          J T. DAVIDSON ET AL          2,536,267
                LINE SPACING MECHANISM FOR ACCOUNTING MACHINES
Original Filed March 3, 1944                       11 Sheets-Sheet 1
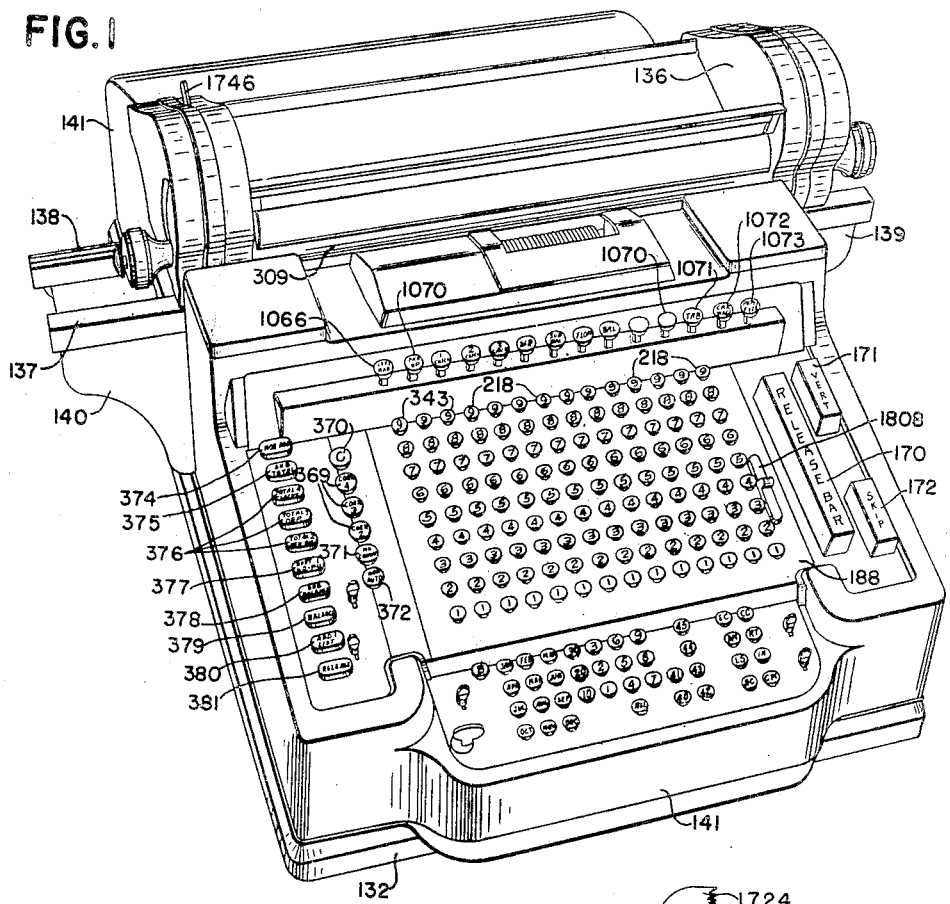
JOHN T. DAVIDSON
JESSE R. GANGER
JAMES H. CRAWFORD &
HERMAN F. SADGEBURY
*INVENTORS*
BY Carl Beust
*THEIR ATTORNEY*

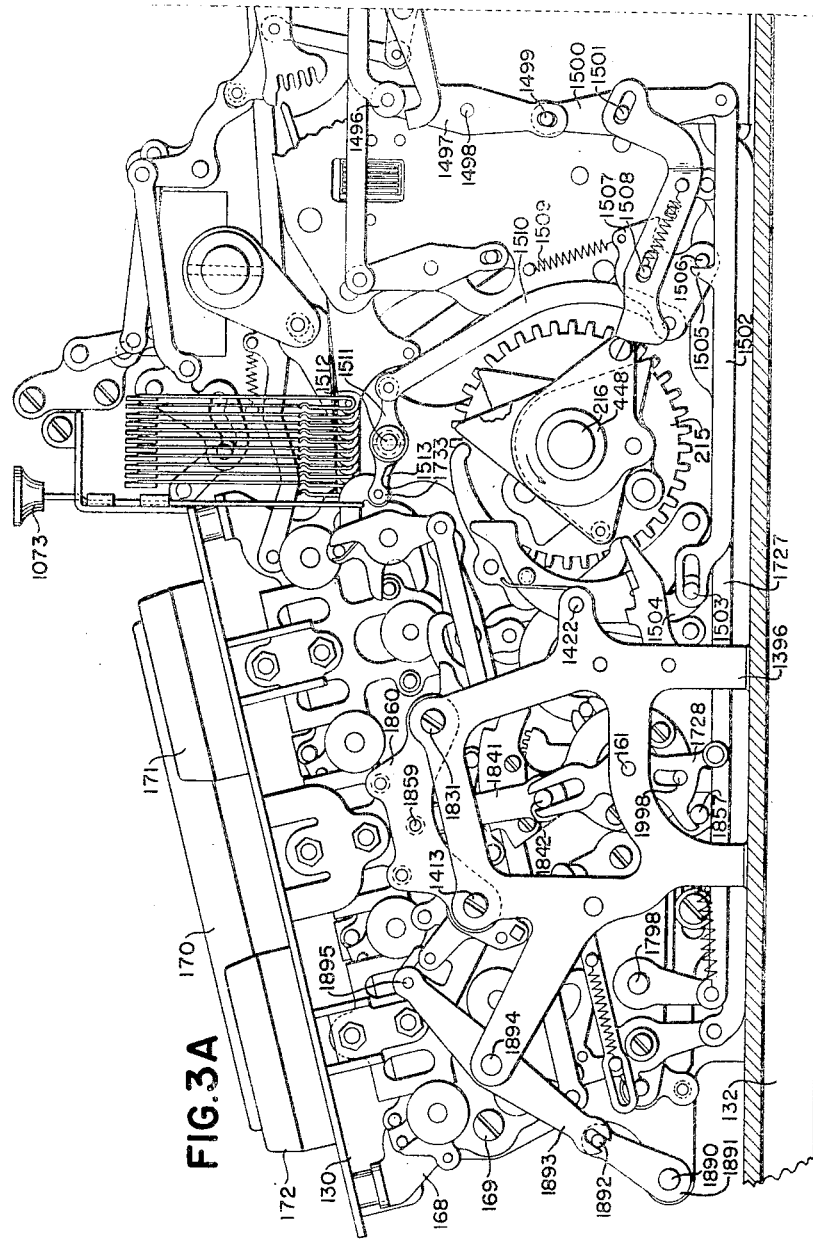
FIG. 3A
FIG. 4
JOHN T. DAVIDSON
JESSE R. GANGER
JAMES H. CRAWFORD &
HERMAN F. SADGEBURY
INVENTORS
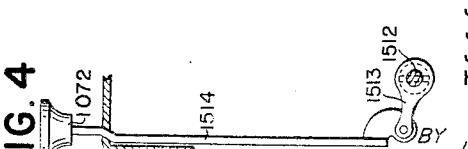
THEIR ATTORNEY JOHN T. DAVIDSON
JESSE R. GANGER
JAMES H. CRAWFORD &
HERMAN F. SADGEBURY
*INVENTORS*

BY Carl Beust

THEIR ATTORNEY

Jan. 2, 1951      J. T. DAVIDSON ET AL      2,536,267
LINE SPACING MECHANISM FOR ACCOUNTING MACHINES
Original Filed March 3, 1944      11 Sheets-Sheet 4

JOHN T. DAVIDSON
JESSE R. GANGER
JAMES H. CRAWFORD &
HERMAN F. SADGEBURY
*INVENTORS*

BY *Earl Beust*

THEIR ATTORNEY

Jan. 2, 1951   J. T. DAVIDSON ET AL   2,536,267
LINE SPACING MECHANISM FOR ACCOUNTING MACHINES
Original Filed March 3, 1944   11 Sheets-Sheet 5

JOHN T. DAVIDSON
JESSE R. GANGER
JAMES H. CRAWFORD &
HERMAN F. SADGEBURY
*INVENTORS*

BY  *Pearl Benst*
THEIR ATTORNEY

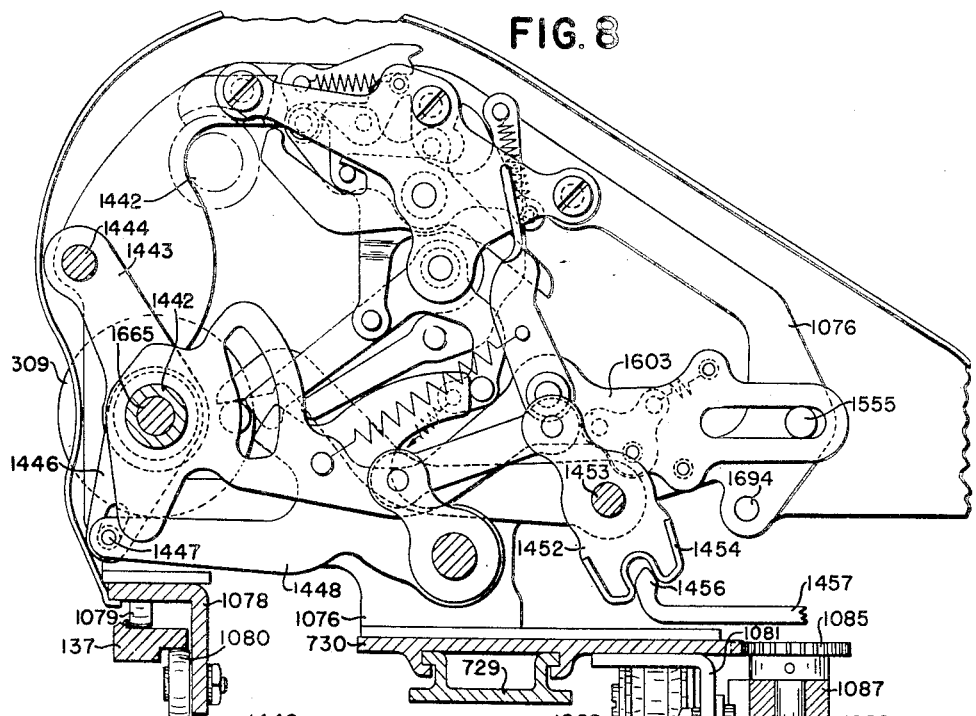
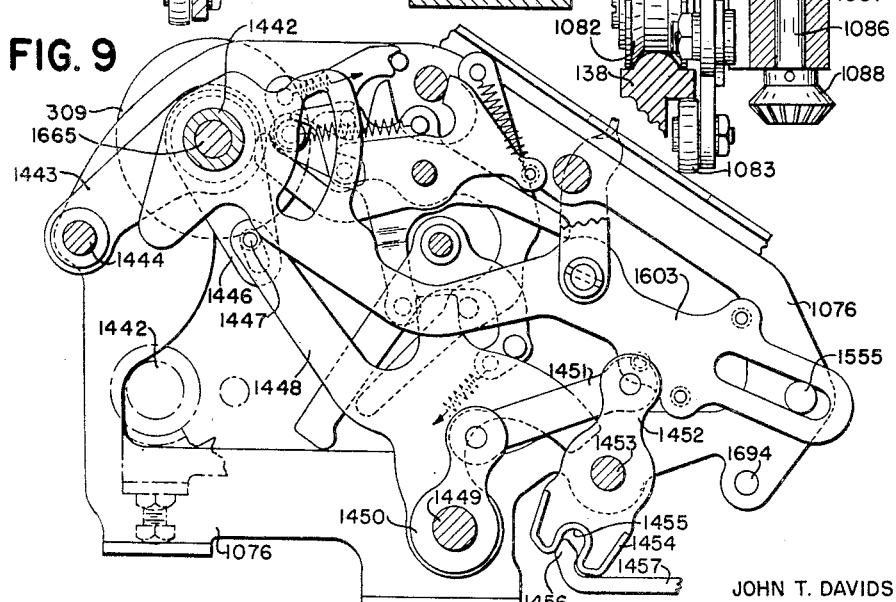

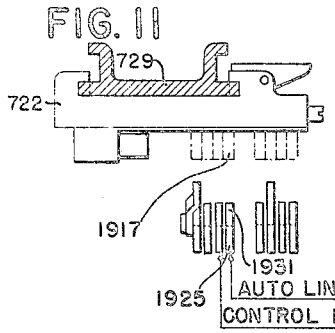
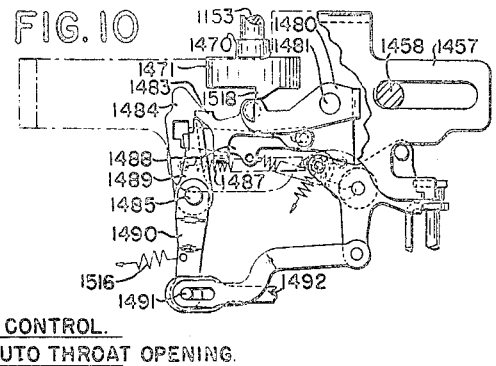
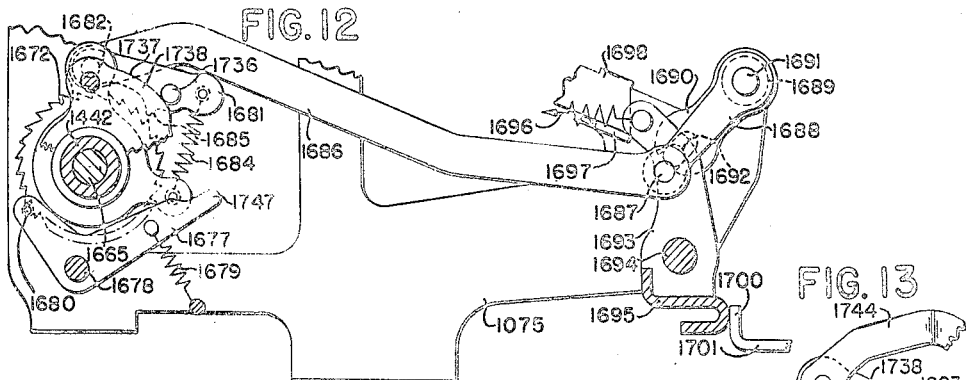
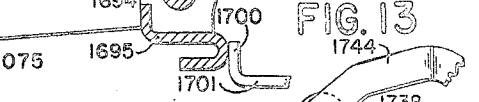
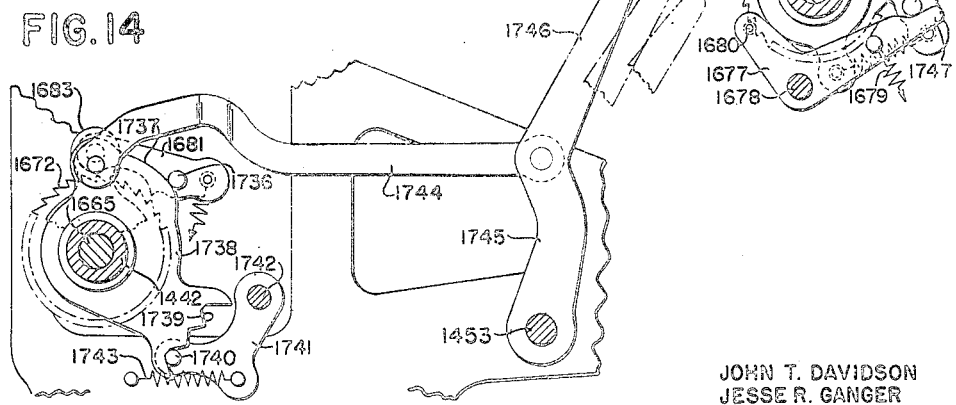

JOHN T. DAVIDSON
JESSE R. GANGER
JAMES H. CRAWFORD &
HERMAN F. SADGEBURY
INVENTORS

BY Carl Benit

THEIR ATTORNEY

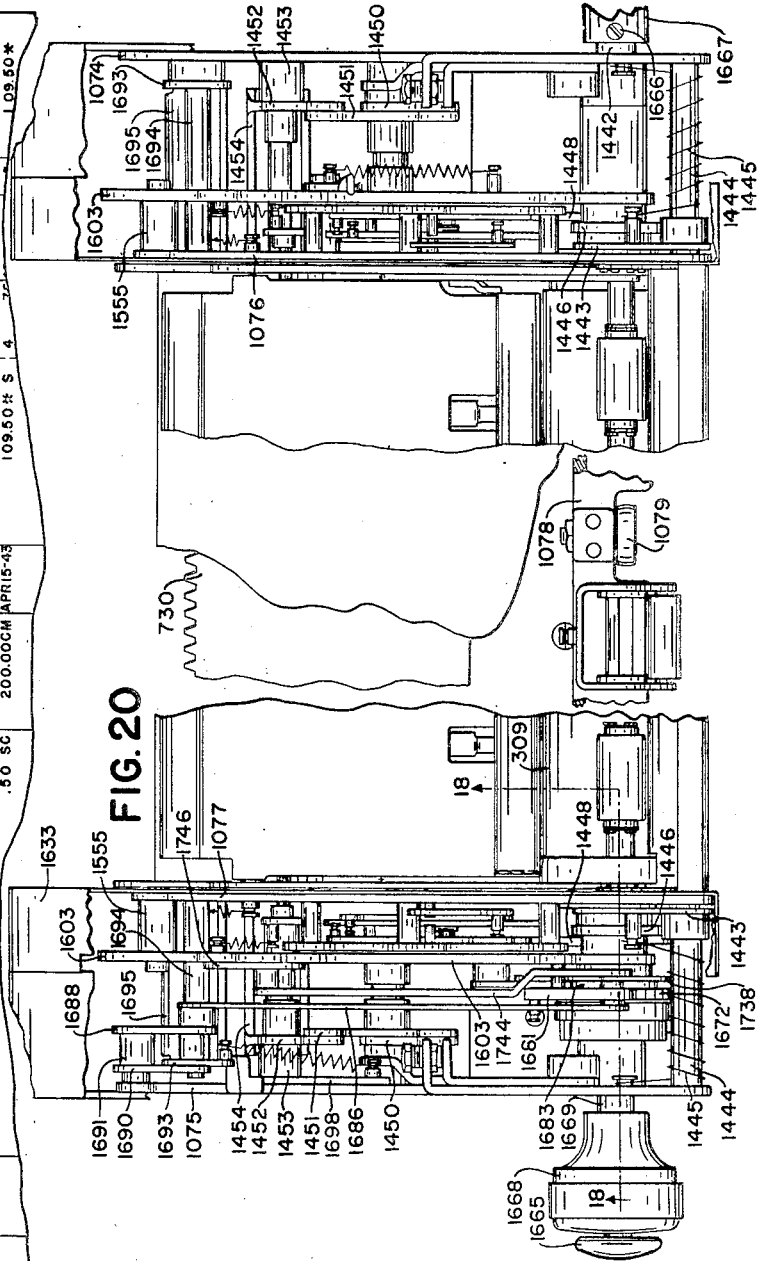

Jan. 2, 1951   J. T. DAVIDSON ET AL   2,536,267
LINE SPACING MECHANISM FOR ACCOUNTING MACHINES
Original Filed March 3, 1944   11 Sheets-Sheet 10
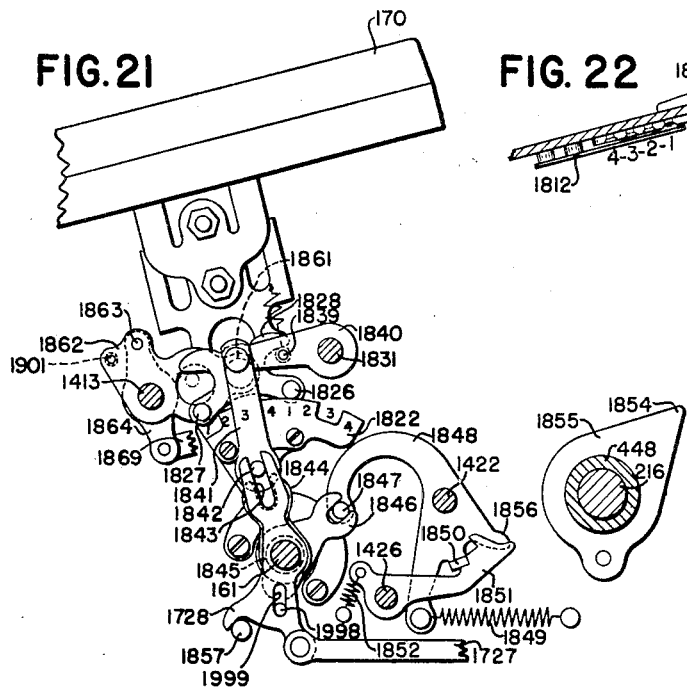
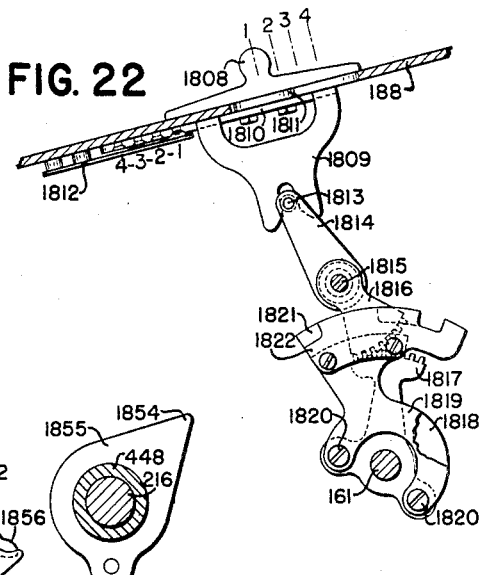
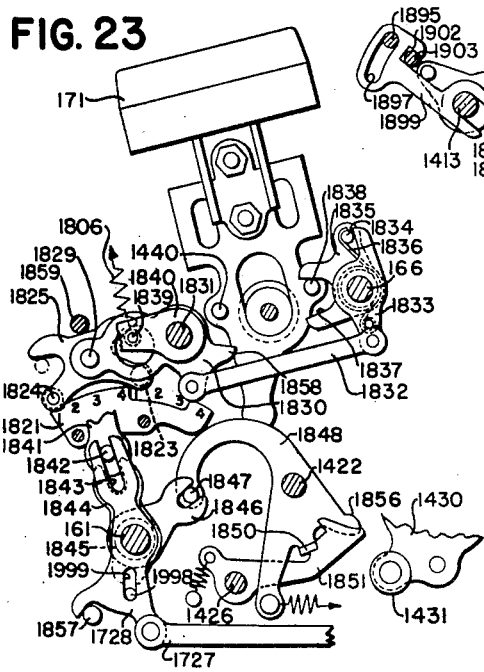
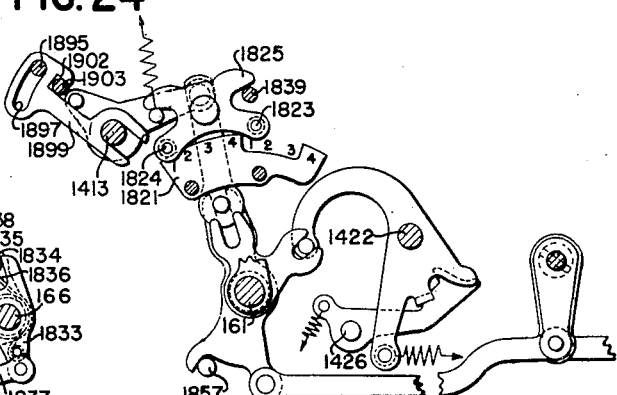
JOHN T. DAVIDSON
JESSE R. GANGER
JAMES H. CRAWFORD &
HERMAN F. SADGEBURY
INVENTORS
BY Carl Beust
THEIR ATTORNEY Jan. 2, 1951     J. T. DAVIDSON ET AL     2,536,267
LINE SPACING MECHANISM FOR ACCOUNTING MACHINES
Original Filed March 3, 1944     11 Sheets-Sheet 11
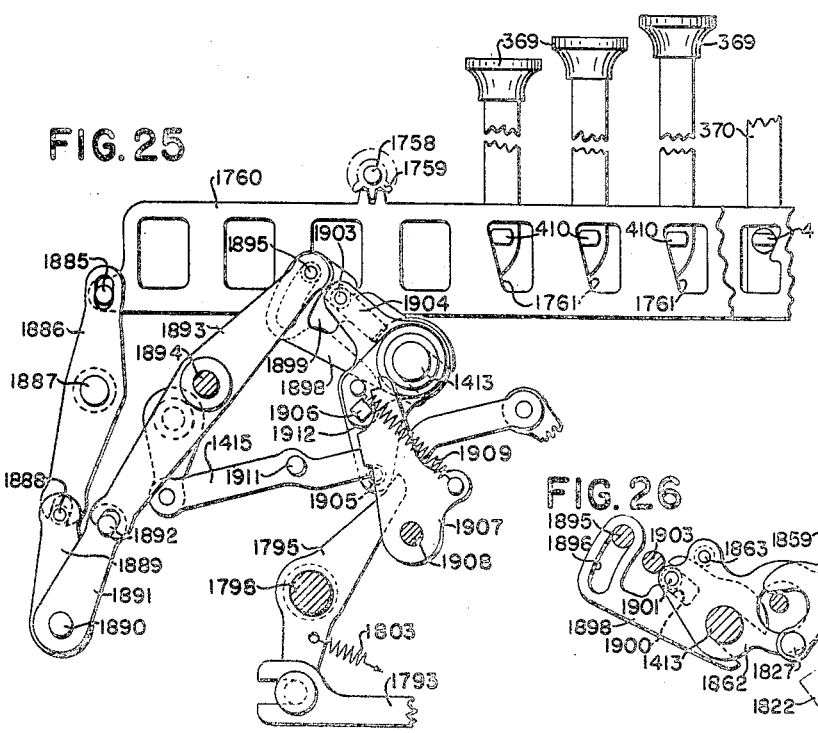
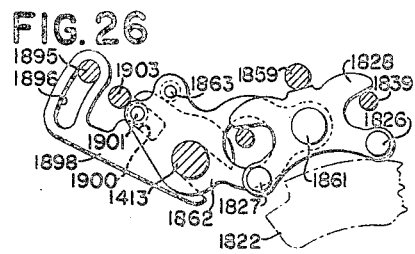
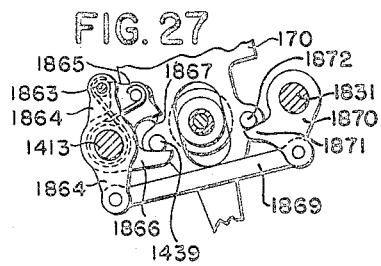
JOHN T. DAVIDSON
JESSE R. GANGER
JAMES H. CRAWFORD &
HERMAN F. SADGEBURY
*INVENTORS*
BY *Carl Bento*
*THEIR ATTORNEY*

Patented Jan. 2, 1951

2,536,267

UNITED STATES PATENT OFFICE 2,536,267

LINE SPACING MECHANISM FOR ACCOUNTING MACHINES

John T. Davidson, Jesse R. Ganger, James H. Crawford, and Herman F. Sadgebury, Dayton, Ohio, assignors to The National Cash Register Company, Dayton, Ohio, a corporation of Maryland Application December 21, 1945, Serial No. 636,356, now Patent No. 2,503,805, dated April 11, 1950, which is a division of application Serial No. 524,846, March 3, 1944, now Patent No. 2,442,402, dated June 1, 1948. Divided and this application January 28, 1948, Serial No. 4,858

15 Claims. (Cl. 197—114)

This application is a division of the application of John T. Davidson et al., Serial No. 636,356, filed December 21, 1945, and since issued as United States Patent No. 2,503,805, dated April 11, 1950, which application is in turn a division of the application of John T. Davidson et al., Serial No. 524,846, filed March 3, 1944, which issued into United States Patent No. 2,442,402 on June 1, 1948.

The present invention is directed to improvements in accounting or bookkeeping machines and the like and is particularly directed to improvements in the line-spacing mechanisms of such machines.

Broadly speaking, the present invention is directed to an improved type of accounting or bookkeeping machine for use in connection with the many complex business systems employed by modern business establishments in the keeping of accurate and permanent records of all the transactions in which they participate. The particular machine chosen to illustrate the present invention is arranged for use by banking establishments in connection with the accounting or bookkeeping problems involved in the balancing of individual checking accounts. However, it is not the desire to limit the features of this invention to any particular machine or to any particular business system.

Many of the basic principles of the machine embodying this invention are disclosed in the following United States patents: Letters Patent of the United States Nos. 1,197,276 and 1,203,863, issued, respectively, September 5, 1916, and November 7, 1916, to Halcolm Ellis; No. 1,819,084, issued August 18, 1931, to Emil John Ens; No. 2,038,717, issued April 28, 1936, to Raymond A. Christian; No. 2,079,355, issued May 4, 1937, to Charles L. Lee; No. 2,181,975, issued December 5, 1939, to Charles L. Lee; No. 2,189,851, issued February 13, 1940, to Paul H. Williams et al., and No. 2,217,221, issued October 8, 1940, to Jesse R. Ganger. Reference may be had to the above patents for the details of construction of the basic portions of the machine, which are described herein only in a general way.

It is an object of the present invention to supply novel means for rotating the platen roll to line-space the record material and to provide means for actuating and controlling said rotating means.

Another object is to provide a selectively controlled device for controlling the line-spacing movement of the platen roll.

Still another object of the invention is to provide means whereby the motor bars or motorized control keys of the machine may or may not cause line-spacing movement of the platen roll, depending upon the position of a manipulable control lever.

A further object of the invention resides in the provision of novel means whereby either the traveling paper carriage, the motor bars, or the motorized control keys may cause line-spacing of the record material.

Still a further object of the invention resides in the provision of means for causing the line-spacing mechanism to be rendered effective or ineffective, depending on whether the motor bars are moved to a partially depressed position or to a fully depressed position.

Another object of the invention is to provide novel means for preventing overthrow of the platen roll during a line-spacing operation.

A further object of the invention is to provide means for preventing the platen roll from being line-spaced as an incident to the movement of the roll from printing position to front-feed position and vice versa.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a perspective view of the complete machine.

Fig. 2 is a detail view of a portion of the mechanism for controlling the line-spacing function of the platen roll.

Figure 3B:
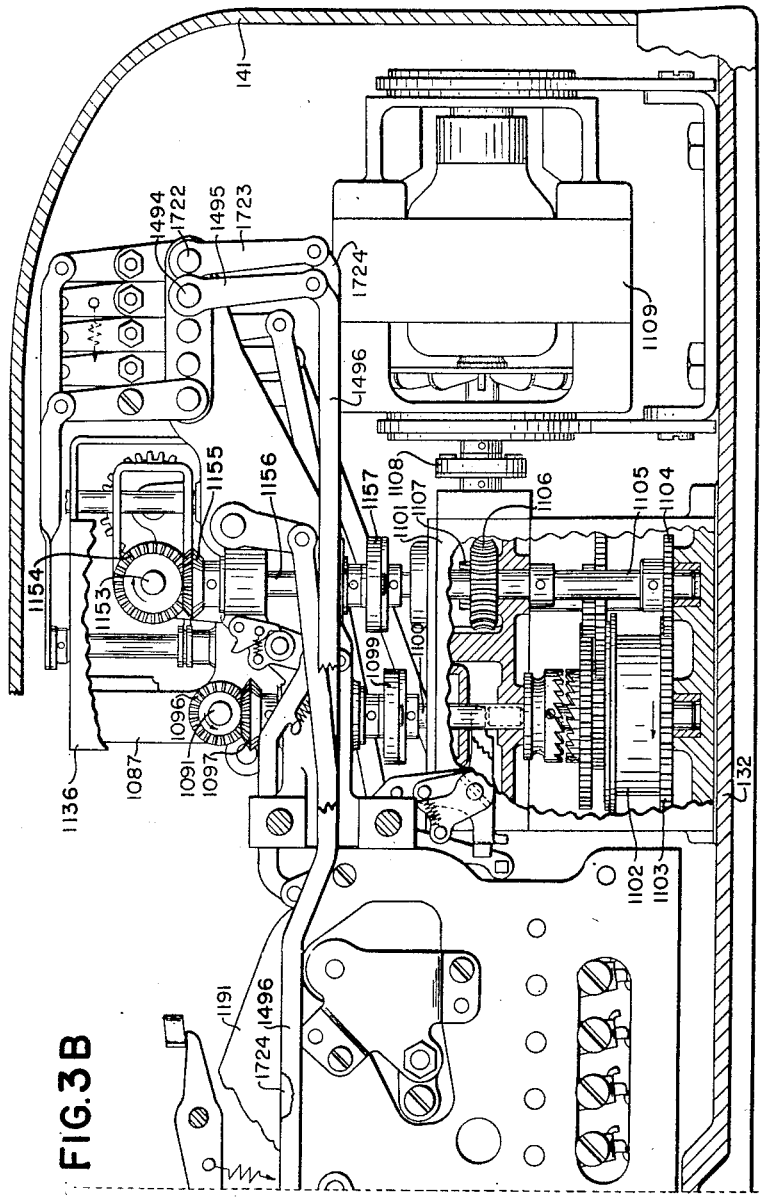

Figs. 3A and 3B together constitute a side elevation of the machine as observed from its right-hand side.

Fig. 4 is a detail view of the key for controlling the opening and closing of the front-feed throat.

Figure 5A:
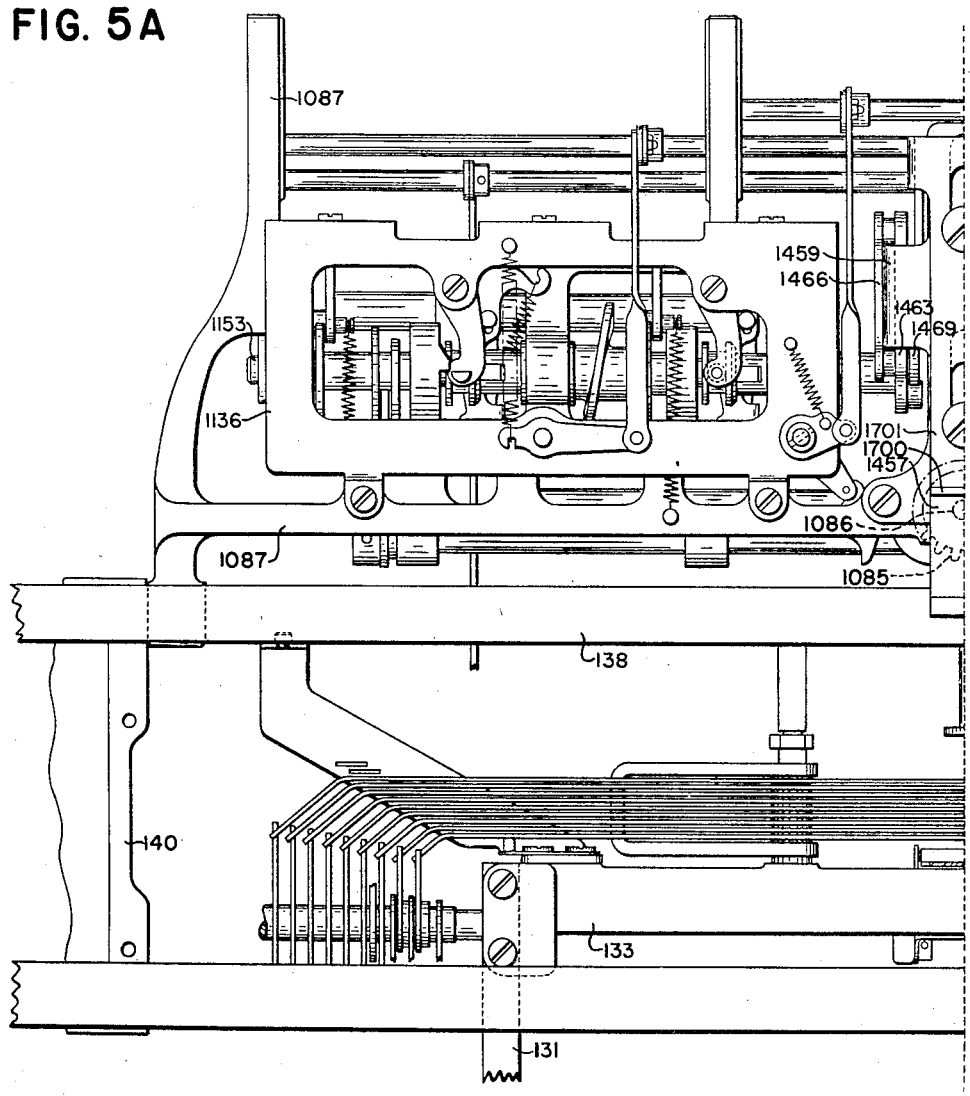
Figure 5B:
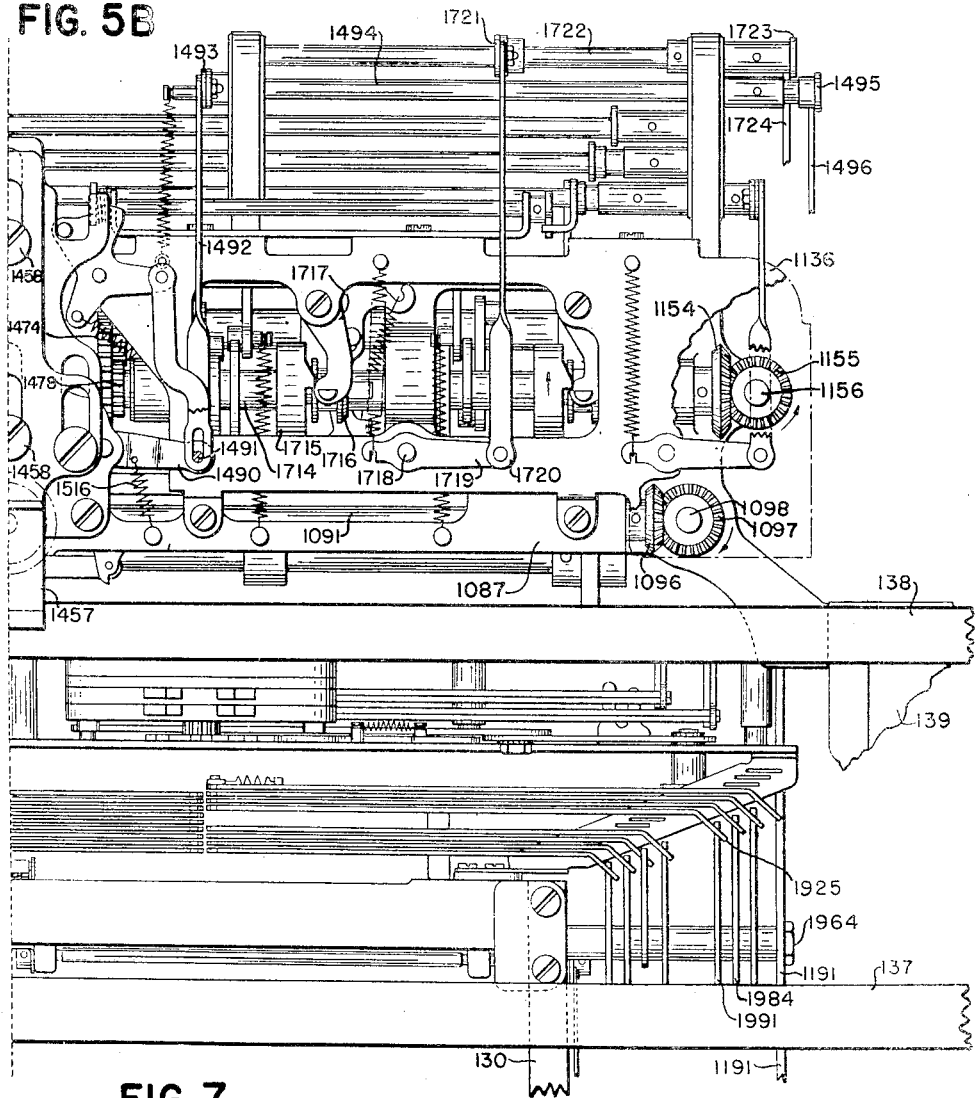

Figs. 5A and 5B together constitute a top plan view of the operating mechanism for the traveling carriage and of the sensing mechanism controlled by control blocks mounted in columnar positions on said carriage, for controlling the various functions of the machine.

Figure 6:
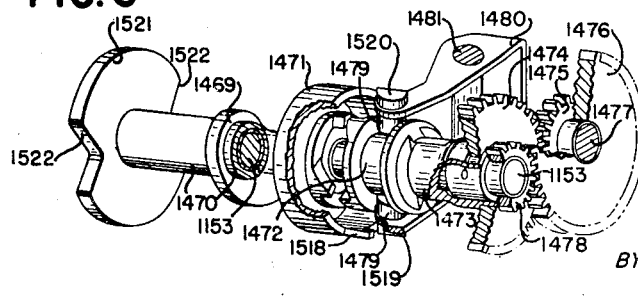

Fig. 6 is a perspective view of the clutch and the gearing associated therewith for moving the traveling carriage platen roll from printing position to front-feeding position and vice versa.

Figure 7:
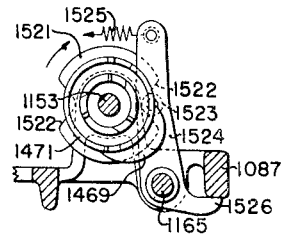

Fig. 7 is a detail view of the homing or disengaging mechanism for the clutch mechanism shown in Fig. 10.

Fig. 8 is a right end view of the traveling carriage with the right cover plate removed to better show the mechanism for shifting the platen roll from printing position to front-feeding position and vice versa, said mechanism being shown in printing position.

Fig. 9 is a right end view showing the relative positions of the parts of Fig. 8, when the platen roll is in front-feed position.

Fig. 10 is a detail view of the clutch mechanism for controlling the opening and closing of the front-feed throat.

Fig. 11 is a cross-sectional view of a portion of the mechanism for controlling various functions of the machine by means of the traveling carriage in selected columnar positions thereof.

Fig. 12 is a detail view of the mechanism for automatically rotating the platen roll to line-space or vertical-feed the record material.

Fig. 13 is a detail view of the feed pawl and the feed retaining pawl for the line-spacing mechanism.

Fig. 14 is a detail view of the manipulative lever and associated mechanism for controlling the extent of movement of the line-spacing mechanism.

Figure 15:
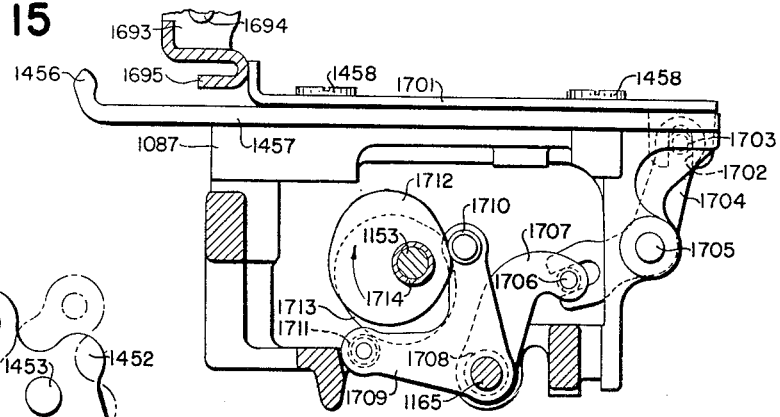

Fig. 15 is a detail view of the cams and associated mechanism for operating the line-spacing or vertical feeding mechanism.

Figure 16:
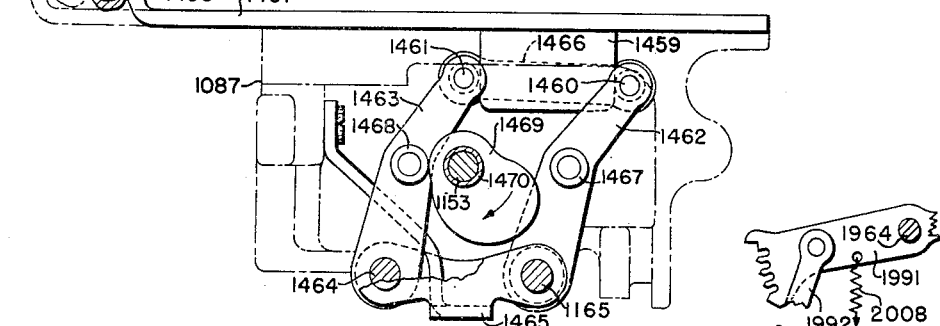

Fig. 16 is a detail view of the cams and associated mechanism for operating the throat-opening mechanism.

Figure 17:
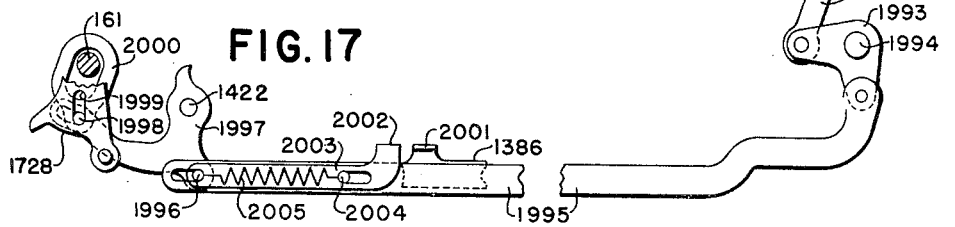

Fig. 17 is a side elevation of a portion of the mechanism controlled by the traveling carriage in columnar positions thereof and by one of the machine release bars, for controlling the line-spacing function of the platen roll.

Figure 18:
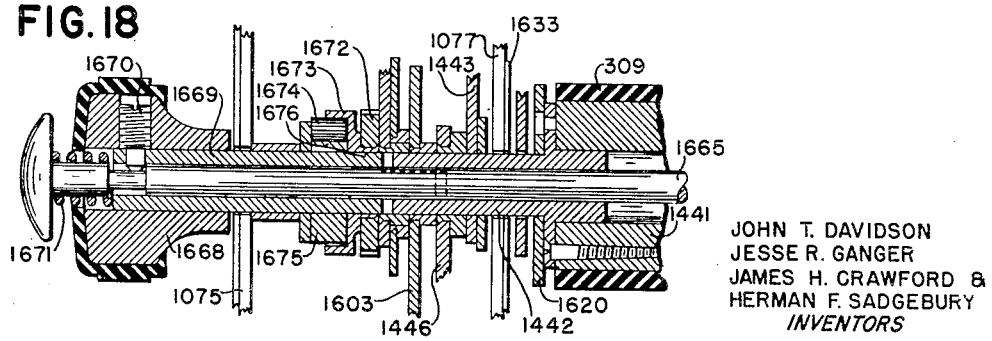

Fig. 18 is a cross-sectional view of the left-hand end of the platen roll taken along line 18—18 (Fig. 20) looking in the direction indicated by the arrows.

Fig. 19 is a facsimile of a fragmentary portion of a statement slip illustrating one use of the machine of this invention.

Fig. 20 is a fragmentary plan view of the traveling carriage.

Fig. 21 is a detail view of a portion of the mechanism for controlling the tabulation of the traveling carriage and for controlling the line-spacing of the platen roll by means of the main release bar.

Fig. 22 is a detail view of the manipulative lever and the selecting mechanism associated therewith for varying the control of the machine release bars over the tabulating mechanism and the line-spacing mechanism.

Fig. 23 is a detail view of one of the auxiliary release bars and the mechanism associated therewith for controlling the line-spacing or vertical feeding movement of the platen roll.

Fig. 24 is a detail view of a portion of the mechanism for controlling the column-to-column tabulating movement of the traveling carriage and for controlling the line-spacing movement of the platen roll.

Fig. 25 is a right side elevation of a portion of the mechanism for controlling the tabulating function of the traveling carriage and the line-spacing function of the platen roll in automatic machine operations.

Fig. 26 is a detail view of a portion of the mechanism associated with the mechanism shown in Fig. 25 for controlling certain functions of the traveling carriage and the platen roll in automatic machine operations.

Fig. 27 is a detail view of a portion of the mechanism for controlling the tabulation of the traveling carriage by means of one of the release bars.

GENERAL DESCRIPTION

The mechanism of the machine chosen to illustrate the present invention is driven by a semi-continuously running type of electric motor, which may be engaged with the main operating mechanism of the machine by any one of the three release bars including a main release bar and two auxiliary bars, or by any one of a plurality of so-called motorized control keys, or automatically by means of the traveling carriage in selected columnar positions thereof.

The machine of the present invention is equipped with a laterally shiftable traveling carriage, which is driven in both tabulating and return directions by a non-positive hydraulic driving mechanism similar in many respects to that disclosed in the Ganger Patent No. 2,217,221. The hydraulic mechanism for the traveling carriage is driven by an independent electric motor, which positively drives an auxiliary cam shaft for controlling all the functions of the traveling carriage with the exception of its tabulating and return movements.

The auxiliary cam shaft for the traveling carriage mechanism drives a plurality of clutch-driven members for a series of clutches which are actuated under the control of the machine controlling mechanisms to initiate the various functions of the traveling carriage, including the opening and closing of the front-feed throat of the traveling carriage and line-spacing movement of the platen roll.

The throat-opening or front-feed mechanism mentioned above, which is actuated by the auxiliary cam shaft, moves the platen roll from printing position to a front-feeding position, and, when said platen roll is in said front-feeding position, the statement sheet, the record sheet, or any other suitable record material may be inserted and/or removed at the front of the platen roll.

The column selection and other functions of the traveling carriage are controlled by a row of keys located just above the regular amount keyboard, said keys including a left margin key, ten column selecting keys, a step-by-step tabulating key, a throat opening key, and a line-spacing or paper feed key.

The functions of the main release bar and one of the auxiliary release bars may be varied and/or controlled by means of a selectively controlled mechanism which may be positioned by means of a fingerpiece located on the main keyboard adjacent to the main release bar.

When the selectively controlled mechanism is in one position, normal depression of the main release bar causes the traveling carriage to be moved in a tabulating direction step by step from one columnar position to the next, and, when said selecting mechanism is in another position, normal depression of said main release bar causes the platen roll to be revolved to line-space the record material supported thereby. Maintaining the main release bar in fully depressed position renders the tabulating mechanism and the line-spacing mechanism referred to above ineffective and in turn effectuates a column selecting mechanism to cause the traveling carriage to be moved to a particular columnar position; and in addition renders another control for the line-spacing mechanism effective to cause the platen roll to be rotated to line-space the record material.

In addition to initiating operation of the machine, depression of any of the motorized control keys shifts the control of the traveling carriage to the selectively controlled mechanism, which, depending upon its position, causes the traveling carriage to be tabulated step by step or causes the platen roll to be rotated to line-space the record material.

The mechanism outlined in general above, which is pertinent to the present invention, will be described in detail in the ensuing pages.

DETAILED DESCRIPTION

Framework

The main framework of the machine embodying this invention comprises a right side frame 130 (Figs. 3A, 5A, and 5B) and a left frame 131 secured to a machine base 132, said right and left frames being secured in fixed relationship to each other by a cross frame 133 and by various other cross frames, rods, and shafts.

The totalizers of the machine are mounted in a framework (not shown) comprising right and left frames and various cross frames, rods, and shafts, said framework being secured to the machine base 132.

The present machine is provided with a laterally shiftable traveling carriage 136 (Figs. 1 and 20), which is supported for shifting movement on rails 137 and 138 (Figs. 5A and 5B) in turn secured to carriage support frames 139 and 140 secured to the machine base 132. The rail 137 is also secured to the right and left frames 130 and 131 and aids in supporting said frames in proper relationship to each other. The mechanism of the machine is enclosed in a suitable cabinet or case 141 (Figs. 1 and 3B), which is in turn secured to the machine base 132.

Operating mechanism

The main mechanism of the machine is driven by a conventional type of electric motor, not shown, but disclosed in one or more of the patents referred to at the beginning of this specification, said motor being secured to the lower surface of the machine base. The electric motor is connected by a clutch mechanism and a train of gears including a gear 215 (Fig. 3A) to a main drive shaft 216 journaled in the main framework of the machine. The energizing of the motor and the engaging of the motor clutch are controlled by any one of three starting bars, including a main starting or Release bar 170, a Vertical feed release bar 171, and a Skip tabulating release bar 172. The three release bars are depressibly mounted on a plate 168 (Fig. 3A) in turn secured to the main frame 130 by screws 169.

Depression of any one of the release bars 170, 171, or 172 (Figs. 1 and 3A) engages the motor clutch mechanism, whereupon said motor drives the main shaft 216 counter-clockwise, as viewed in Fig. 3A, through one revolution of movement, which is required for each machine operation. As the main shaft 216 nears the end of one counter-clockwise revolution, the clutch mechanism is automatically disengaged to terminate operation of the machine in the usual and well-known manner.

In addition to the release bars 170, 171, and 172 (Fig. 1), machine operation may be initiated by certain control keys and by means of the traveling carriage in predetermined columnar positions thereof. However, this releasing mechanism is not pertinent to this invention and will not be further explained herein.

Keyboard and differential

By referring to Fig. 1, it will be seen that in the present construction there are eleven rows of amount keys 218 and three rows of item-counting keys 343, which are similar in every respect to the amount keys and, together with said amount keys, are mounted in a removable keyboard framework 188.

In structure and functioning, the amount keys are similar in every respect to the amount keys of the machine disclosed in United States Patent No. 2,189,851, issued to Paul H. Williams et al., to which reference may be had for a more detailed description of the keyboard mechanism than is believed necessary in connection with this specification.

To the immediate left of the item-counting keys 343 is a row of keys including three Correction keys 369, used in correcting errors in certain of the totalizers, a Control key 370, a No-Count key 371, and a Non-Auto key 372. Located to the left of the Correction keys is a row of control keys including keys 374 to 380 inclusive for controlling the various functions of the totalizers, and including a Release key 381 for releasing any depressed keys of the main keyboard.

Located immediately above the amount and item-counting keys is a row of carriage control keys (Fig. 1) including a Left Margin key 1066, ten column-selecting keys 1070, a Tabulating key 1071, a Carriage throat-opening key 1072, and a Paper Feed or vertical feed key 1073.

Located beneath the amount keyboard is an auxiliary keyboard containing date and symbol printing keys. The main and auxiliary keyboards also include various locks for controlling the depression and release of certain keys.

The machine release bars 170, 171, and 172, which are located on the extreme right of the main keyboard, have associated therewith a selectively controlled mechanism for controlling certain functions of the machine and the traveling carriage, and the operation of this selectively controlled mechanism may be varied by means of a manually positionable control slide 1808 (Figs. 1 and 22) mounted on the main keyboard between the release bar 170 and the first row of amount keys 218.

Each denominational row of amount keys has associated therewith an amount differential actuator (not shown) positionable in adding and subtracting operations under influence of the corresponding amount keys 218. The actuators in turn position corresponding printing elements, which record the value of the depressed amount keys upon record material supported by the platen roll of the traveling carriage 136. Each of the amount actuators has a rearwardly-disposed extension rack, each of which has three sets of rack teeth on its upper edge and three sets of rack teeth on its lower edge, which cooperate with the corresponding denominational wheels of the six totalizer lines with which the machine is provided, said totalizer lines being arranged in vertical pairs at the rear of the machine, as is the usual practice with machines of this type.

The various totalizers of the machine are selected for engagement with the amount actuators in adding, subtracting, sub-total, and total operations, either by means of the traveling carriage in columnar positions thereof, or by means of the control keys 374 to 380 inclusive (Fig. 1).

Traveling carriage

Referring to Fig. 1, the traveling carriage 136 supports a platen roll 309 for presenting record material, such as a statement slip 1550, a fragment of which is shown in Fig. 19, to the printing mechanism.

The platen roll 309 is movable from a printing position to a more accessible position, often referred to as front-feed or open-throat position, for the ready removal and insertion of record material at the front of the platen roll 309 instead of the conventional method of inserting record material at the back of the platen roll, and winding said material around said roll. Such a traveling carriage as this is often referred to as a front-feed type of traveling carriage, and, when the platen roll 309 is moved from printing position to front-feed position, the pressure rollers are released and the throat for guiding the record material around said platen roll is opened, so that the statement sheet which has been audited may be readily removed from the machine and a new sheet inserted into the open throat and pushed directly into position by the aid of a line-finding device, which forms a part of the front-feed throat.

In addition to the statement slip 1550 (Fig. 19), which is inserted in the front of the machine, as explained above, a duplicate of all entries for a certain period of time, such as a day, is recorded on a journal sheet, which is wound around the platen roll 309 in the conventional manner and is retained in place by pressure rollers provided for that purpose when the traveling carriage is moved from printing position to open-throat position and vice versa.

The traveling carriage 136 is movable in a tabulating direction and in a return direction, and the mechanism for moving said carriage in either of said directions is connected by a hydraulic clutch device to a semi-continuously running motor, which operates in unison with but independently of the main operating motor for the machine proper and is for the primary purpose of operating the traveling carriage mechanism.

The semi-continuously running motor for the traveling carriage, in addition to driving said carriage in return and tabulating directions, is directly connected to and operates a shaft for driving a plurality of cams which are connectable to said shaft by their respective clutch devices, which are in turn controlled by the carriage control keys 1070, 1071, 1072, and 1073 (Fig. 1) for operating the different mechanisms associated with the traveling carriage. The cams referred to above operate, respectively, the mechanism for pulling down the carriage stop plungers, the mechanism for reversing movement of the traveling carriage, the throat-opening mechanism for moving the platen roll from printing position to open-throat or front-feed position and vice versa, the mechanism for rotating the platen roll to cause the record material to be line-spaced, and the mechanism for operating the automatic machine-releasing mechanism.

The framework for the traveling carriage 136 (Figs. 1, 8, and 20) comprises right and left outside plates 1074 and 1075 and right and left inside plates 1076 and 1077, secured in fixed relationship to each other by a bottom plate 730 and by an angle bar 1078, which bar 1078 supports upper and lower rollers 1079 and 1080, which cooperate, respectively, with the top surface of the rail 137 and the lower surface of a flange thereof to support the front end of the traveling carriage 136 for shifting movement. Secured to the bottom surface of the plate 730 is an angle bar 1081, which supports a plurality of upper and lower rollers 1082 and 1083, said upper rollers 1082 having therein V-shaped annular grooves which cooperate with the rounded upper surface of the rail 138 to support the traveling carriage for lateral shifting movement, and at the same time to prevent side displacement of said carriage. The rollers 1083 cooperate with the lower surface of a flange formed on the rail 138 and, in cooperation with the rollers 1080, prevent upward displacement of the carriage 136.

The rear edge of the bottom plate 730 has gear teeth thereon which mesh with a gear 1085 secured on the upper end of a shaft 1086 vertically mounted for rotation in a frame 1087 supported by the end frames 139 and 140 (Figs. 5A and 5B). The shaft 1086 has secured on its lower end a bevel pinion which meshes with two similar carriage reversing gears (not shown). The two reversing gears have clutch teeth which mesh with similar clutch teeth in reversing clutch members (not shown) suitably supported on a shaft 1091 (Figs. 3B and 5B) journaled in the frame 1087. The shaft 1091 has secured on its right-hand end a bevel gear 1096, which meshes with a corresponding bevel gear 1097 secured on the upper end of a vertical shaft 1098 journaled in the frame 1087 and connected by a flexible coupling 1099 (Fig. 3B) to a vertical shaft 1100 for the hydraulic mechanism, said shaft being journaled in a hydraulic device framework 1101 secured to the machine base 132.

The shaft 1100 has a non-positive fluid connection to a fluid drive device 1102, which is similar in every respect to the hydraulic device disclosed in the United States Patent No. 2,217,221, issued to Jesse R. Ganger on October 8, 1940, and for that reason will be but briefly described herein.

The cylindrical hydraulic member 1102 (Fig. 3B) has on its lower end a tenon which journals in a bushing in the frame-like casting 1101, and said member likewise has secured to its bottom surface a gear 1103, which meshes with a gear 1104 secured on the lower end of a shaft 1105 mounted for vertical rotation in the casting 1101. The shaft 1105 has secured on its upper end a worm gear 1106, which meshes with a companion worm gear 1107 secured on a short shaft journaled in the casting 1101 in axial alinement with the armature shaft of a carriage motor 1109 secured to the base 132 and connected to said armature shaft by a flexible coupling 1108, which forms a yieldable driving medium between said motor 1109 and the hydraulic device. The hydraulic member 1102 is submerged in oil contained in the casting 1101, said casting forming a reservoir for constantly replenishing the oil in said hydraulic member 1102.

The motor 1109, through the gearing and connections described above, drives the hydraulic member 1102 in the direction indicated by the arrow, and, as said member has a fluid connection to the shaft 1100, said shaft is non-positively driven in the same direction, which movement, through the flexible coupling 1099, is imparted to the shaft 1098 (Fig. 5B) and to the bevel gear 1097, which in turn drives the gear 1096 and the shaft 1091 counter-clockwise as viewed in Fig. 3B. Two clutch members supported by the shaft 1091 are driven in unison with said shaft and through their corresponding bevel gears move the traveling carriage 136 either in a tabulating direction or in a return direction, depending upon which of said clutch members is engaged with the corresponding bevel gear.

Also driven by the continuously running motor 1109 is a power shaft 1153 (Figs. 3B and 4B) journaled in the frame 1087. Secured on the right-hand end of the shaft 1153 is a bevel gear 1154, which meshes with another bevel gear 1155 secured to the upper end of a vertical shaft 1156 journaled in the frame 1087 in axial alinement with the shaft 1195 and connected thereto by a flexible coupling 1157. The above-described train of mechanism positively connects the shaft 1153 to the motor 1109 to thereby continuously rotate the shaft in a clockwise direction as viewed in Fig. 3B.

*Traveling carriage throat-opening mechanism*

By referring to Fig. 20, it will be recalled that the platen roll 309 is mounted in a traveling carriage framework comprising right and left outside plates 1074 and 1075 and right and left inside plates 1076 and 1077 secured in fixed relationship to each other by the bottom plate 730 and the angle bar 1078, and that said carriage carries rollers which cooperate with the front rail 137 and the rear rail 138 for mounting said carriage for horizontal shifting movement.

The mechanism for moving the platen roll 309 (Fig. 20) to and from printing position is mounted between the plates 1074 and 1075 and 1076 and 1077, and this mechanism is substantially duplicated on each side of the traveling carriage.

Directing attention to Figs. 8, 9, 18, and 20, the platen roll 309 has a wooden core 1441 with a central bore which receives tenons on right and left trunnion bushings 1442 having flanges which are fastened to the core 1441 by suitable screws.

The trunnion bushings 1442 extend through irregular openings in the plates 1076 and 1077, and their outside diameters are freely engaged by holes in the upper ends of similar arms 1443 having secured in their lower ends hubs which freely engage studs 1444 extending between the plates 1074 and 1075 and 1076 and 1077, respectively. Torsion springs 1445, freely coiled around the studs 1444, are tensioned to urge the arms 1443 counter-clockwise (Fig. 8) to assist the platen roll 309 to open-throat or front-feeding position and to thereby partially counterbalance the weight of said platen roll so that it may easily be moved to and from printing position. Also free on the right and left bushings 1442 are similar cranks 1446 having in their lower ends slots which are engaged by studs 1447 in the upper ends of arms 1448 secured on a shaft 1449 journaled in the plates 1074 to 1077 inclusive. Also secured on opposite ends of the shaft 1449 are similar cranks 1450 connected by links 1451 to upward extensions of similar arms 1452 free on their respective studs 1453 supported, respectively, by the plates 1074 and 1076, and 1075 and 1077. Extending between the arms 1452 and secured thereto is a bar 1454 having a horizontal groove 1455 formed therein, which cooperates with an upward extension 1456 of an operating slide 1457 mounted for horizontal reciprocating movement by means of parallel slots therein (Figs. 5A, 5B, 15, and 16) in cooperation with screw studs 1458 secured in the frame 1087. A depending portion 1459 of the slide 1457 is embraced by studs 1460 and 1461 in similar arms 1462 and 1463 pivoted at their lower ends, respectively, to the rod 1165 and a stud 1464, said stud being supported by a bracket 1465 in turn supported by the rod 1165 and having an upward extension which is secured to the frame 1087. A link 1466 (Fig. 16), extending between the studs 1460 and 1461, maintains said studs in proper spaced relationship to the depending portion 1459.

The arms 1462 and 1463 carry, respectively, rollers 1467 and 1468, which cooperate with the periphery of a plate cam 1469, connected by a hub 1470 (Figs. 5B, 6, 7, 10, and 16), free on the shaft 1153, to a clutch driven member 1471. The clutch driven member 1471 has clutch teeth which cooperate with corresponding clutch teeth in a clutch driving member 1472 having a tongue and groove connection to a sleeve 1473 free on the shaft 1153 and having secured thereon a gear 1474, which meshes with a pinion 1475 integral with a gear 1476 free on a stud 1477 secured in the frame 1087. The gear 1476 meshes with a pinion 1478 secured on the shaft 1153, said gearing forming a reduction drive between said shaft 1153 and the sleeve 1473, which drives the clutch driving member 1472.

The clutch driving member 1472 has therein an annular groove engaged by opposed shifting studs 1479 secured in the parallel arms of a shifting yoke 1480 free on a stud 1481 supported by the frame 1087 and the right top plate 1136 (Figs. 5B and 6). An extension 1483 (Fig. 10) of the lower arm of the yoke 1480 is engaged by the tooth of a latch 1484 free on a shaft 1485 journaled in the frame 1087, said latch and said yoke 1480 having tensioned therebetween a spring 1487, which urges these parts clockwise to normally maintain said extension 1483 in engagement with the tooth of the latch 1484. The latch 1484 (Fig. 10) has therein an L-shaped slot, through which extends an upward projection of an arm 1488 pivotally and shiftably mounted on the lower arm of the yoke 1480 by means of a stud therein in cooperation with a slot in said lower arm. The upward projection of the arm 1488 extends into the path of a finger 1489 secured on the shaft 1485, said shaft also having secured thereon an arm 1490 (see also Figs. 3B and 5B) having in its lower end a stud 1491, which engages a slot in the forward end of a link 1492. The rearward end of the link 1492 is connected to an arm 1493 adjustably connected to a shaft 1494 journaled in the frame 1087 by means of a bolt-and-nut connection to a crank secured on said shaft.

Also secured on the shaft 1494 is a depending arm 1495 pivotally connected by a link 1496 to a lever 1497 free on a stud 1498 (Figs. 3A and 3B) secured in the plate 1191. The lower end of the lever 1497 has a slot which engages a stud 1499 in the upper end of a companion lever 1500 free on a stud 1501 fast in the plate 1191. The lower end of the lever 1500 has pivotally connected thereto the rearward end of a link 1502, the forward end of which is slotted to receive a stud 1503 in the lower end of a lever 1504 free on the stud 1422. The link 1502 has an upward projection 1505 (Fig. 3A), which cooperates with a stud 1506 in a plate 1507 free on a stud 1508 secured in the plate 1191. A link 1510 pivotally connects the plate 1507 to a crank 1511 secured on the right-hand end of a shaft 1512 journaled in a boring in the stud 304, said shaft having also secured thereon a crank 1513 pivotally connected to the lower end of the stem portion 1514 of the Carriage key 1072. A spring 1509, tensioned between the plate 1507 and a stationary stud, urges said plate counter-clockwise (Fig. 3A) to normally maintain the Carriage key 1072 in undepressed position.

Depression of the key 1072 (Figs. 3A and 4) rocks the plate 1507 clockwise against the action of the spring 1509, causing the stud 1506, in cooperation with the projection 1505, to shift the link 1502 forwardly. Forward movement of the link 1502, through the levers 1500 and 1497, also shifts the link 1496 (Figs. 3B and 5B) forwardly to rock the shaft 1494 and the arm 1493 clockwise against the action of a spring 1515. Clockwise movement of the arm 1493 shifts the link 1492 (Figs. 5B and 10) rearwardly, causing the slot in its forward end, in cooperation with the stud 1491, to rock the arm 1490, the shaft 1485, and the finger 1489 counter-clockwise, as viewed here, against the action of a spring 1516 tensioned between said arm 1490 and a stud in the frame 1087. Counter-clockwise movement of the finger 1489, in cooperation with the upward projection of the arm 1488 and the narrow portion of the slot in the latch 1484, rocks said latch counter-clockwise out of engagement with the extension 1483 to release the yoke 1480 to the action of the spring 1487, which immediately rocks said yoke clockwise (Figs. 5B, 6, and 10) to cause said yoke to shift the clutch driving member 1472 into engagement with the teeth in the clutch driven member 1471 to drive said clutch driven member and the cam 1469 clockwise, as viewed in Figs. 6 and 16.

In Figs. 8 and 16, the slide 1457 is shown in the position which it occupies when the platen roll 309 is in printing position. Clockwise movement of the cam 1469, in cooperation with the roller 1468, shifts the arms 1463 and 1462 forwardly or counter-clockwise, causing the studs 1460 and 1461 in said arms, in cooperation with the depending portion 1459, to shift the slide 1457 forwardly to the position shown in full lines in Fig. 9 and in dot-and-dash lines in Fig. 16. To effect the shifting of the slide 1457 as explained above requires one-half revolution of the cam 1469 (Fig. 16), and, after said cam makes one-half revolution, the clutch mechanism is disengaged in a manner to be explained presently and remains thus disengaged until the Carriage key is again depressed.

Forward movement of the slide 1457 causes the upward extension 1456, in cooperation with the horizontal groove 1455 in the bar 1454, to rock said bar and the arms 1452 clockwise from the position shown in Fig. 8 to the position shown in Fig. 9. Clockwise movement of the arms 1452, by means of the links 1451, imparts a similar movement to the cranks 1450, the shaft 1494, and the arm 1448, to rock said parts from the position shown in Fig. 8 to the position shown in Fig. 9. Clockwise movement of the arms 1448, by means of the stud 1447 in cooperation with the slots in the cranks 1446, rocks the platen roll 309, which is pivoted through the arms 1443 to the studs 1444, counter-clockwise from printing position, as shown in Fig. 8, to open-throat position, as shown in Fig. 9.

Clockwise engaging movement of the yoke 1480 (Fig. 10) causes a bent-over extension thereon to engage the arm 1488 and rock said arm clockwise against the action of a spring to shift the upturned projection of said arm into the wide portion of the slot in the latch 1484, to permit the spring 1487 to immediately return the tooth of said latch into the path of the extension 1483. After the clutch member 1471 and the cam 1469 (Figs. 6 and 10) have completed one-half revolution, the angular camming surface on a node 1518 on the edge of said clutch member 1471 engages a flattened extension 1519 of the stud 1479 in the lower arm of the yoke 1480 to rock said yoke counter-clockwise to disengage the teeth of the clutch driving member 1472 from the teeth in the driven member 1471 and to permit the tooth of the latch 1484 to latch over the extension 1483 to prevent further operation of said clutch driven member 1471, to cause the platen roll to remain in open-throat position.

When pressure is released on the Carriage key 1072 (Figs. 3A, 3B, and 4), the springs 1509, 1515, and 1516 (Fig. 10) return the corresponding parts to normal position, thus disengaging the shoulder on the end of the finger 1489 from the upturned projection 1488 to release said arm to the action of its spring, which immediately shifts said arm counter-clockwise to move said upward projection into the narrow portion of the slot in the latch 1484 in preparation for another operation of the throat-opening and -closing mechanism.

Again depressing the Carriage key 1072 (Figs. 3A, 3B, and 4) renders the clutch mechanism shown in Fig. 10 again effective to cause the clutch driven member 1471 and the cam 1469 (Fig. 16) to be driven another one-half revolution clockwise. This second one-half revolution of the cam 1469, in cooperation with the roller 1467, rocks the arms 1462 and 1463 clockwise, causing the studs 1460 and 1461, in cooperation with the portion 1459, to shift the slide 1457 rearwardly to normal or printing position, as shown in Fig. 16, to rock the platen roll 309 from open-throat position, as shown in Fig. 9, to printing position, as shown in Fig. 8. After the cam 1469 has completed its second one-half revolution of movement, as explained above, the node 1518 (Figs. 6 and 10) of the clutch member 1471, in cooperation with a flattened extension 1520 of the stud 1479 in the upper arm of the yoke 1480, restores said yoke counter-clockwise in exactly the same manner as explained above.

A locating disk 1521 (Figs. 6 and 7), secured in fixed relationship to the cam 1469 and the clutch member 1471 by the sleeve 1470, has diametrically opposed locating notches 1522, which cooperate with a roller 1523 carried by a lever 1524 free on the rod 1165 and urged counter-clockwise by a strong spring 1525, to assist and retain said cam 1469 and clutch member 1471 in either of their moved positions. An extension 1526 on the lower end of the lever 1524, in cooperation with a finished surface on the frame 1087, determines the extent of movement of said lever under influence of the spring 1525.

*Platen rotating or line-spacing mechanism*

By referring to Figs. 18 and 20, it will be recalled that the platen roll 309 has a wooden core 1441 with a central bore therein which receives tenons on the trunnion bushings 1442, said bushings having flanges which are secured to the ends of the wooden core by means of screws. The outside circumferences of the trunnion bushings 1442 support the platen roll 309 for rotating or line-spacing movement and likewise for movement to and from printing position, and likewise support certain of the mechanism shown in Figs. 8 and 9 and explained earlier herein for controlling the movement of the platen roll to and from printing position. The central bores in the bushings 1442 are in axial alinement and support a rod 1665, which is secured against displacement by a set screw 1666 (Fig. 20), which likewise secures a right-hand knob 1667, for manually rotating the platen roll, to the bushing 1442. There is a left-hand knob 1668 (Figs. 18 and 20) similar to the right-hand knob for manually rotating the platen roll 309, and this knob is secured to a sleeve 1669, which is slidably supported by the rod 1665 and is connected to the left-hand trunnion bushing 1442 by means of tenons thereon in cooperation with clutch cuts in said trunnion bushing 1442. A set screw 1670 (Fig. 18), threaded in the knob 1668, has a tenon which engages an annular groove in the rod 1665. A compression spring 1671, compressed between a head on the left-hand end of the rod 1665 and the end of the sleeve 1669, urges said sleeve and the knob 1668 toward the right, as viewed here, to normally render effective a clutch mechanism for clutching a platen roll feeding ratchet 1672 to the sleeve 1669 for rotation in unison therewith to render the means for automatically line-spacing the platen roll 309 effective. The feed ratchet 1672 is free on the outside circumference of the sleeve 1669 and has integral therewith a drum-shaped portion 1673 having a knurled interior circumference which cooperates with a knurled roller 1674 mounted in a slot in a disk 1675 connected to the sleeve 1669 for rotation in unison therewith by means of an angular flat portion of said sleeve, in cooperation with a wedge block 1676, said wedge block freely engaging a slot in said disk 1675.

Normally the spring 1671 urges the knob 1668 and the sleeve 1669 toward the right, causing the angular flat surface on said sleeve, in cooperation with the wedge block 1676, to shift the knurled roller 1674 upwardly to engage the knurls thereof with the corresponding knurls in the interior circumference of the drum 1673, to clutch said drum 1673 and the feeding ratchet 1672 to the sleeve 1669, which, it will be recalled, is connected to the trunnion bushing 1442.

In case it is desirable to disconnect the platen roll 309 from the feeding ratchet 1672, in order to adjust record material in relation to the printing line, moving the knob 1668 outwardly against the action of the spring 1671 retracts the angular flat surface on the sleeve 1669 from the wedge 1676 to permit said wedge and the knurled roller 1674 to shift downwardly to disengage the knurled teeth of said roller from the knurled teeth on the inside circumference of the drum 1673, to disconnect the feed ratchet 1672 from the platen roll 309, so that said roll may be revolved independently thereof to adjust the record material in relation to the printing line and the platen roll line-spacing mechanism.

Mechanism cooperating with the ratchet 1672 and disclosed in Figs. 12, 13 and 14 is provided for automatically rotating the platen roll 309 to line-space the record material supported thereby.

A ratchet retaining pawl 1677 is pivotally mounted on a stud 1678 secured in a left-hand arm 1693, and a spring 1679 urges said retaining pawl clockwise to normally maintain a stud 1680, secured therein, in contact with the teeth of the ratchet 1672, to retain said ratchet and the platen roll 309 in line-spaced position. The stud 1680 permits rotation of the ratchet 1672 in either direction. A ratchet feed pawl 1681 is pivotally mounted on a stud 1682 secured in a feed pawl operating arm 1683 having a hub free on the left bushing 1442. A spring 1684, tensioned between the pawl 1681 and the arm 1683, urges said pawl clockwise to cause a tooth 1685 thereon to engage the teeth of the ratchet 1672 when the arm 1683 is rocked back and forth, as will be explained presently. The stud 1682 pivotally supports the forward end of a link 1686, the rear end of which is pivotally supported by a stud 1687 secured in a crank 1688 connected by a hub 1689 to a companion arm 1690, said hub being pivotally mounted on a stud 1691 secured in the plate 1075. The lower end of the arm 1690 is slotted to embrace a stud 1692 secured in a left-hand arm 1693 free on a left-hand stud 1694 extending between the plates 1075 and 1077 (Fig. 20) and connected by a bail 1695 to a companion right-hand arm 1693 rotatably supported on a right-hand stud 1694 extending between the plates 1074 and 1076. A spring 1696 urges the arm 1693 and the bail 1695 counter-clockwise to normally maintain the upper end of the left-hand arm 1693 in contact with a bent-over ear 1697 formed on a plate 1698 secured to the plate 1075.

The rear edge of the bail 1695 (Figs. 12 and 15) is curled over to form a rounded external surface, which cooperates with a bent-up extension 1700 on a line-spacing slide 1701 slidably mounted by means of parallel slots therein (Figs. 5A and 5B) in cooperation with the screw studs 1458, said slide 1701 being mounted immediately above the slide 1457 and separated therefrom by washers on the screw studs 1458. The slide 1701 has a downward extension with a slot 1702 (Fig. 15), which engages a stud 1703 in the upper end of a crank 1704 secured to a stud 1705 journaled in a boring in the frame 1087. An extension of the crank 1704 is slotted to receive a stud 1706 in an arm 1707 secured on one end of a sleeve 1708 free on a rod 1165. Secured on the other end of the sleeve 1708 is a V-shaped lever 1709 carrying rollers 1710 and 1711, which cooperate, respectively, with the peripheries of companion plate cams 1712 and 1713, which, together with a locating disk, are secured in fixed relationship to each other on a sleeve 1714 free on the shaft 1153.

The sleeve 1714 may be selectively connected with or disconnected from the shaft 1153 by means of a clutch mechanism similar to the clutch mechanism for the front-feed throat device. This clutch mechanism was clearly shown and described earlier herein in connection with Figs. 6, 7, and 10 and, hence, will not be again considered in detail. The only difference between the clutch for the line-spacing mechanism and that for the front-feed throat mechanism is that the former is a one-revolution clutch instead of a half-revolution clutch. In other words, the flattened extension 1520 (Fig. 6) is absent from the latter clutch, so that the driven member will make one complete revolution each time the clutch is operated before it will be disengaged by the extension 1519 striking against the node 1518.

Also secured to the sleeve 1714 is a clutch driven member 1715 having teeth which cooperate with a clutch driving member 1716 connected by tenons and clutch cuts to a sleeve secured to the shaft 1153, so that said clutch driving member rotates in unison with said shaft while it is free to shift laterally thereon. The clutch driving member 1716 is actuated by a yoke 1717 in turn controlled by a latch member secured on a shaft 1718 rotatably mounted in the frame 1087 and the right-hand top plate 1136, said shaft also having secured thereto an arm 1719 urged clockwise by a spring to normally maintain the latch in engagement with the yoke 1717. The arm 1719 is connected by a link 1720 to a crank 1721 secured on a shaft 1722 journaled in extensions of the frame 1087. Secured on the right-hand end of the shaft 1722 is a crank 1723 connected by a link 1724 (Figs. 2, 3A, and 3B) to a lever 1725 free on the stud 1498. The lower end of the lever 1725 is slotted to receive a stud in the upper end of a lever 1726 free on the stud 1501, said lever 1726 being pivotally connected by a link 1727 to the lower end of a lever 1728 free on the stud 161. The link 1727 (Figs. 2 and 3A) has an upward extension 1729, which cooperates with a stud 1730 in a plate 1731 free on the stud 1508 and pivotally connected by a link 1732 to a lever 1733 free on the shaft 1512. The forward end of the lever 1733 is pivotally connected to a bent-over portion of the stem of the Paper Feed key 1073 (see also Fig. 1). A spring 1734 urges the plate 1731 counter-clockwise, which, through the link 1732 and the lever 1733, maintains the key 1073 normally in undepressed position. Depression of the Paper Feed key 1073 (Figs. 1, 2, 3A, 3B, and 5B) rocks the plate 1731 clockwise against the action of the spring 1734, causing the stud 1730, in cooperation with the extension 1729, to shift the link 1727 forwardly. Forward movement of the link 1727, through the levers 1726 and 1725, also shifts the link 1724 forwardly to rock the crank 1723 (Fig. 3B), the shaft 1722, and the crank 1721 clockwise. Clockwise movement of the crank 1721, through the link 1720, rocks the arm 1719 and the shaft 1718 counter-clockwise, as viewed in Fig. 5B, to disengage the latch from the yoke 1717 to cause said yoke to engage the clutch driving member 1716 with the clutch driven member 1715 to cause the cams 1712 and 1713 (Fig. 15) to be driven one clockwise revolution, after which the clutch mechanism is automatically disengaged.

Revolution of the cams 1712 and 1713 (Fig. 15), through the train of mechanism shown here, shifts the slide 1701 first forwardly and then back to normal position. Forward movement of the slide 1701 (Figs. 5A, 5B, 12, and 20), through its upward extension 1700, in cooperation with the rounded portion of the bail 1695, rocks said bail and the arm 1693 first clockwise, which movement, through the stud 1692, the arm 1690, the crank 1688, and the link 1686, rocks the arm 1683 also clockwise. Clockwise movement of the arm 1683 causes the tooth 1685 of the pawl 1681, under action of the spring 1684, to engage the teeth of the ratchet 1672 to revolve the platen roll 309 counter-clockwise to line-space the record material wound therearound.

In addition to the Paper Feed key 1073, other mechanism controlled by the traveling carriage in predetermined columnar positions thereof and by the machine release bars is provided for causing the paper feeding mechanism to function in the manner outlined above, and such mechanism will be explained later.

Return rearward movement of the slide 1701 (Fig. 12) permits the spring 1696 to return the arms 1693, the bail 1695, and connected parts, including the arm 1683 and the pawl 1681, counter-clockwise or in a take-up direction, in preparation for the next paper feeding operation.

Line-spacing control

A cam mechanism is provided for controlling the engagement of the tooth 1685 (Fig. 12) of the pawl 1681 with the teeth of the ratchet 1672 to determine whether the platen roll 309 and the record material supported thereby will be advanced one, two, or three line spaces.

Directing attention to Figs. 12, 13, and 14, the ratchet feed pawl 1681 has a stud 1736, which cooperates with an arcuate surface 1737 on a plate 1738 having a hub free on the hub for the arm 1683, said plate having, in an extension thereof, three locating notches 1739, which cooperate with a stud 1740 in a retaining pawl 1741 free on a stud 1742 in the left-half arm 1603 and urged clockwise by a spring 1743 to normally maintain said stud in yielding engagement with said locating notches. A link 1744 pivotally connects the plate 1738 to a lever 1745 free on a left-hand stud 1453 and having a finger piece 1746, which extends through an opening in a left-hand cover plate 1633.

When the arm 1683 and the pawl 1681 are in their take-up positions, as shown here, the arcuate surface 1737, in cooperation with the stud 1736, maintains the tooth 1685 of said pawl out of engagement with the teeth in the ratchet 1672. When the lever 1745 and the plate 1738 are in the position shown in full lines in Fig. 14, clockwise feeding movement of the pawl 1681 causes the stud 1736 to ride off of the arcuate surface 1737 at the earliest possible time and, in so doing, causes the tooth 1685 to engage the teeth of the ratchet 1672 sufficiently early so that continued clockwise movement of said pawl 1681 advances the ratchet 1672 and the platen 309 the equivalent of three ratchet teeth to triple-space the record material. Moving the lever 1745 and the plate 1738 one step clockwise, as shown in dot-and-dash lines in Fig. 14, causes the arcuate surface 1737 on said plate to delay the engagement of the tooth of the pawl 1681 with the ratchet 1672 sufficiently so that clockwise movement of said pawl will advance said ratchet and the platen roll the equivalent of two ratchet teeth to double-space the record material. Moving the lever 1745 and the plate 1738 another step clockwise, as shown in dot-and-dash lines in Fig. 14, causes the arcuate surface 1737, in cooperation with the stud 1736, to further delay engaging movement of the tooth of the pawl 1681 so that full clockwise movement of said pawl will advance the ratchet 1672 and the platen roll 309 the equivalent of one ratchet tooth to single-space the record material supported thereby.

When the feed pawl 1681 reaches the terminus of its feeding movement in a clockwise direction, as shown in Fig. 13, the stud 1736, in cooperation with an extended finger 1747 on the retaining pawl 1677, locks said pawl and the stud 1680 against ratcheting movement to in turn cause said stud to lock the ratchet 1672 and the platen roll 309 to insure accurate line-spacing of said ratchet and to prevent overthrow in case of fast operations of the paper feeding mechanism.

It will be noted that the retaining pawl 1677 is pivoted on a stud 1678, which is mounted in the arm 1603, and will therefore move with the platen roll as it is shifted to and from printing position, so as to maintain the roll in its adjusted position during such movement of the roll. Furthermore, the retaining pawl 1741 is also pivoted on a stud (1742), which is secured to the arm 1603, so that this pawl will, like the pawl 1677, move with the platen roll when it is shifted to and from printing position and thereby retain the plate 1738 in its adjusted position. During movement of the platen roll from printing position to front-feed position and vice versa, the point at which the link 1744 is pivotally connected to the plate 1738 will follow a curved path corresponding in general to the path followed by the trunnions 1442. Since the lever 1746 is freely pivoted in the carriage frame on the stud 1453, the lever will be able to rock backward and forward as the platen roll is raised or lowered, so as not to interfere with the setting of the plate 1738.

In the case of the paper feed link 1686, however, its rear end is pivoted on the stud 1687 secured in the crank 1688, which remains stationary except when a line-spacing operation is being performed. Hence, the forward end of the link and the stud 1682 are constrained to move along an arc having as its center the stud 1687. Thus the feed pawl 1681 will be rocked first counter-clockwise and then clockwise with respect to the plate 1738 as the platen roll is moved to and from front-feed position. The stud 1736 on the pawl will therefore ride back and forth along the arcuate surface 1737, thus holding the tooth 1685 out of engagement with the ratchet 1672 and preventing line-spacing movement of the platen roll.

*Line-spacing control by release bars*

The main Release bar 170 and the Vertical feed bar 171 (Fig. 1), in addition to initiating operation of the machine, are arranged to control the line-spacing movement or rotation of the platen roll 309. The control of the line-spacing movement of the platen roll, under influence of the bars 170 and 171, may be varied by means of a sensing mechanism which cooperates with mutilated control segments in turn positioned in relation to said sensing mechanism by the manipulative slide 1808 (Figs. 1 and 22).

The slide 1808 is slidably mounted on the amount keyboard top plate 188 by means of a bottom plate 1810, which is spaced slightly more than the thickness of said top plate 188 from the bottom surface of said slide 1808 by a spacer 1811, said plate 1810 and said spacer being secured by screws to the slide 1808. As presently arranged, the slide 1808 has four control positions in which it may be located and retained by a spring locating member 1812 secured to the bottom surface of the plate 188, said locating member having an embossed spherical projection which engages any one of four countersunk holes in the plate 1810, said holes corresponding to the four positions of the slide 1808. A downward extension 1809 of the bottom plate 1810 has a slot which engages a stud 1813 in a crank 1814 secured on the left-hand end of a short shaft 1815 journaled in a central bore in a stationary stud 177. Secured on the right-hand end of the shaft 1815 (Fig. 22) is a gear sector 1816, which meshes with a companion sector 1817 free on the stud 161 and having secured thereto arms 1818 and 1819, which are properly spaced from said sector 1817 by two spacers and secured in fixed relationship thereto by two screw studs 1820, which also support the spacers. The arms 1818 and 1819 have secured to their upper ends control segments 1821 and 1822. The segments 1821 and 1822 are secured to their respective arms 1818 and 1819 by screws, so that said segments may be removed and replaced by segments having different control surfaces, if desired.

The mutilated periphery of the segment 1821 cooperates with sensing studs 1823 and 1824 (Figs. 23 and 24) secured in symmetrical extensions of a sensing member 1825, and the mutilated periphery of the control segment 1822 cooperates with sensing studs 1826 and 1827 secured in symmetrical extensions of a sensing member 1828 (Fig. 21). The member 1825 (Figs. 23 and 24) is pivotally supported by a stud 1829 in an arm 1830 free on a stud 1831 extending between plates 168 and 1396 (Fig. 3A). The arm 1830 is connected by a link 1832 to an arm 1833 free on a stud 166 (Fig. 23), said arm having an upward extension which is normally maintained in contact with a stud 1834 in an arm 1835, also free on the stud 166, by a torsion spring 1836 tensioned between said arms. The arm 1835 has a slot 1837, which cooperates with a stud 1838 in the lower stem portion of the Vertical Feed bar 171.

Normal depression of the Vertical Feed bar 171 causes the stud 1838, in cooperation with the lower surface of the slot 1837, to rock the arms 1835 and 1833 counter-clockwise, which movement, by means of the link 1832, is imparted to the arm 1830. Counter-clockwise movement of the arm 1830 causes the sensing member 1825 to sense for high and low spots on the periphery of the control segment 1821, and, if said segment is so positioned by the slide 1808 (Fig. 22) that a low portion of its periphery is opposite the stud 1823 and a high portion of said periphery is opposite the stud 1824, as shown in Figs. 22 and 23, counter-clockwise movement of the arm 1830 causes the stud 1823 to be moved downwardly into the low portion of the periphery of said segment 1821. As the stud 1824 is held against movement by the high portion of the periphery of the segment 1821, the member 1825 moves clockwise, causing the right-hand one of symmetrical extensions on its upper edge to engage a stud 1839 in an arm 1840 free on the stud 1831 and rock said arm counter-clockwise against the action of a spring 1806.

The arm 1840 (Figs. 21 and 23) has pivotally connected thereto the upper end of a bar 1841 carrying a stud 1842 in its lower end, which engages a slot 1843 in the lever 1726, which, it will be recalled by referring to Figs. 2, 3A, 3B, and 5B, is operatively connected to the clutch mechanism for driving the cams 1712 and 1713 (Fig. 15) for imparting line-spacing movement to the platen roll 309. The slot 1843 coincides with a similar slot in an arm 1844 connected by a hub 1845, free on the stud 161, to a companion arm 1846 slotted to receive a stud 1847 in a vertical feed actuator 1848 free on a stud 1422 and urged counter-clockwise by a spring 1849 to normally maintain a bent-over ear 1850 thereof in engagement with the shoulder of a latch 1851 free on a stud 1426 and urged counter-clockwise by a spring 1852 into engagement with said ear 1850. Counter-clockwise movement of the arm 1840 (Figs. 21 and 23) shifts the bar 1841 and the stud 1842 downwardly to move said stud into engagement with the slot in the arm 1844 to connect said arm to the lever 1726 for unitary operating movement.

With the parts in the positions described above, operation of the machine and resultant counter-clockwise revolution of the main cam shaft 216 (Figs. 3A and 21) causes a node 1854 on a tripping cam 1855 secured on the sleeve 443 to disengage the latch 1851 from the ear 1850 immediately after printing has been effected. Disengagement of the latch 1851 releases the actuator 1848 to the action of the spring 1849, which immediately rocks said actuator counter-clockwise, which, by means of the stud 1847, rocks the arms 1846 and 1844 and, through the stud 1842, the lever 1728 clockwise. Clockwise movement of the lever 1728 (Figs. 2, 3A, 3B, 5B, and 21), through the link 1727, the levers 1726 and 1725, the link 1724, and the crank 1723, rocks the shaft 1722 to render the clutch mechanism for the line-spacing mechanism effective to cause the platen roll to be revolved to line-space the record material supported thereby in exactly the same manner as explained in connection with the Paper Feed key 1073.

Near the end of machine operation, a roller 1431 on a cam 1430 (Fig. 17), secured to the main cam shaft 216, engages a rounded nose 1856 on the actuator 1848 and restores said actuator clockwise until the shoulder on the latch 1851 latches over the ear 1850 to retain said lever and connected parts in normal or restored positions. Normal position of the lever 1728 (Fig. 2) and connected parts is determined by a downward extension of said lever in cooperation with a stud 1857.

Full depression of the Vertical Feed release bar 171 (Fig. 23) and retention of said bar fully depressed cause a stud 1440 therein to engage an extension 1858 of the arm 1830 and rock said arm clockwise against the action of the spring 1836 to restore the sensing member 1825 upwardly to normal position, which in turn restores the bar 1841 (Figs. 21 and 23) upwardly to uncouple the lever 1728 from the arm 1844, to prevent operation of the line-spacing mechanism under influence of the Vertical Feed bar 171.

By referring to Figs. 23 and 24, it will be noted that the periphery of the control segment 1821 is undercut in relation to the sensing stud 1823 corresponding to positions #1, #2, and #3 of the control slide 1808 (Fig. 22). Therefore, when said control slide is in either #1, #2, or #3 position and the release bar 171 is normally depressed, automatic line-spacing of the platen roll 309 will result. When the slide 1808 is in position #4, a high portion of the periphery of the segment 1821 is opposite the stud 1823 to obstruct downward movement of the member 1825 and the bar 1841, and, as a result, the platen roll 309 is not rotated for line-spacing movement. By referring to Fig. 23, it will be noted that the stud 1839 in the arm 1840 extends through a clearance hole or opening in the arm 1830. A stop stud 1859 (Figs. 3A and 23), secured in an auxiliary plate 1860 in turn secured to the front plate 1396, is engaged by a flat surface in the center of the sensing member 1825, under influence of the spring 1806, to determine the normal positions of said member, the arms 1830 and 1840, and the bar 1841.

The sensing member 1828 (Figs. 21, 26, and 27) is pivotally supported by a stud 1861 in an arm 1862 free on a stud 1413 and connected by a stud 1863 to an arm 1864 also free on said stud 1413. The arm 1864 (Fig. 27) is yieldingly connected, by a torsion spring 1865, to a companion arm 1866 free on the stud 1413, said torsion spring retaining an upward extension of said arm 1866 normally in engagement with a left-hand extension of the stud 1863. The arm 1866 has a slot 1867, which straddles a stud 1439 in the stem portion of the main Release bar 170. A downward extension of the arm 1864 is connected by a link 1869 to an arm 1870 free on the stud 1831 and having an extension 1871, which cooperates with a stud 1872 in the stem portion of the Release bar 170.

When the control slide 1808 (Fig. 22) is in #3 position, an undercut portion of the periphery of the control segment 1822 is opposite the stud 1826, and, upon normal depression of the Release bar 170 (Fig. 27), the stud 1439, in cooperation with the lower surface of the slot 1867, rocks the arm 1866 and, through the spring 1865, the arm 1864 clockwise, as viewed here. The arm 1864, through the stud 1863, rocks the arm 1862 (Fig. 21) in unison therewith.

Inasmuch as a high portion of the periphery of the segment 1822 is opposite the stud 1827 and an undercut portion of said periphery is opposite the stud 1826, clockwise movement of the arm 1862 causes the sensing member 1828 to rock clockwise or downwardly, and, as a right-hand extension of said member overlies the stud 1839, the arm 1840 is simultaneously rocked counterclockwise against the action of the spring 1806 to move the stud 1842 into engagement with the slot in the arm 1844 to connect said arm to the lever 1728 in the manner previously explained, to cause the platen roll to be automatically rotated to line-space the record material wound therearound. However, if the Release bar 170 is moved to its fully depressed position, the stud 172, in cooperation with the extension 1871, will rock the arm 1870 and, through the link 1869, the arm 1864 counterclockwise against the action of spring 1865. Counterclockwise movement of arm 1864, through the stud 1863, carries the arm 1862 in unison therewith to restore the sensing member 1828 upwardly to ineffective position, so that the line-spacing mechanism will not be operated.

When operation of the machine is initiated by any one of the motorized keys 369, 376, 377, 378, and 379 (Fig. 25), the sensing member 1828 is rendered operative and, depending upon the position of the control slide 1808, causes the platen roll 309 to be line-spaced.

The control keys 376, 377, 378, and 379 (Fig. 1) have pins which cooperate with angular camming surfaces in openings in a control plate (not shown) mounted for horizontal shifting movement by means of rollers mounted in the framework of the control key bank.

The Correction keys 369 (Fig. 25) carry pins 410, which cooperate with angular camming surfaces 1761 in openings in a control plate 1760 mounted for horizontal shifting movement in exactly the same manner as the first-mentioned control plate. The control plates are connected for concerted movement by means of gear teeth in their upper edges in cooperation with corresponding segmental pinions 1757 (only one shown) secured on opposite ends of a short shaft 1758 journaled in the keyboard framework.

From the foregoing it is evident that depression of any of the control keys 376, 377, 378, or 379, or depression of any of the Correction keys 369 (Fig. 25) shifts both of the control plates forwardly in unison.

The control plate 1760 (Fig. 25) has in its forward end a stud 1885, which engages a slot in the upper end of a lever 1886 free on a stud 1887 secured in the keyboard framework. The lower end of the lever 1886 is slotted to receive a stud 1888 secured in the upper end of a crank 1889 in turn fast on the left-hand end of a shaft 1890, opposite ends of which are journaled in the keyboard framework and an extension of the right frame 130 (Fig. 3A). Secured on the right-hand end of the shaft 1890 is a crank 1891 carrying a stud 1892 engaged by a slot in the lower end of a lever 1893 free on a stud 1894 secured in a forward extension of the plate 1396. The upper end of the lever 1893 (Figs. 3A, 24, 25, and 26) carries a stud 1895, which engages similar arcuate slots 1896 and 1897 in arms 1898 and 1899, the lower ends of which arms are slotted to embrace the stud 1413.

Normally a notch 1900 (Fig. 26) in the arm 1898 engages a stud 1901 in the arms 1862, and a notch 1902 (Fig. 24) in the arm 1899 normally engages a stud 1903 secured in the upper end of an arm 1904 (Fig. 25) free on the stud 1413. A downward extension of the arm 1904 carries a stud 1905 adapted to be engaged by an extension of an arm 1795 free on a stationary stud 1798, which arms 1795, through the medium of a link 1793 and a spring 1803, is rocked first counter-clockwise and back to normal position whenever the machine is released for operation by use of any of the motorized keys 376, 377, 378, and 379 or by use of any of the motorized keys 369 in the manner fully disclosed in the co-pending application of John T. Davidson et al., Serial No. 524,846, filed March 3, 1944, now United States Patent No. 2,442,402.

Depression of any one of the keys 376 to 379 inclusive, or any one of the keys 369, shifts the control plate 1760 forwardly, which movement, through the stud 1885, the lever 1886, the crank 1889, and the crank 1891, rocks the lever 1893 counter-clockwise, as viewed in Fig. 25. Counter-clockwise movement of the lever 1893, through the stud 1895, shifts the arms 1898 and 1899 outwardly or forwardly so as to disengage the notch 1902 in the arm 1899 from the stud 1903, and simultaneously to engage the notch 1900 in the arm 1898 with said stud 1903. Initial counter-clockwise movement of the arm 1795, through the stud 1905, rocks the arm 1904 clockwise, causing the stud 1903, in cooperation with the slot 1900 and a stud 1901 in the arm 1862 (Figs. 21 and 26), to rock said arm 1862 clockwise in unison therewith. Clockwise movement of the arm 1862 causes the sensing member 1828 to move downwardly, whereupon the studs 1826 and 1827 therein sense the control surface of the segment 1822 in the manner previously explained.

If the slide 1808 (Fig. 22) is in #3 position, the segment 1822 (Figs. 21 and 26) will be so positioned that an undercut or low portion of its periphery is opposite the stud 1826 and a high portion of said periphery is opposite the stud 1827. Consequently the right-hand ear of the sensing member 1828 (Figs. 21 and 23) will engage the stud 1839 to rock the arm 1840 downwardly or counter-clockwise to cause the stud 1842 to engage the slot in the arm 1844 to in turn cause the platen roll 309 to be line-spaced in the manner explained earlier herein.

Upon full initial clockwise movement of the arm 1904 (Fig. 25) under influence of the arm 1795, as explained above, a square stud 1906 in a plate 1912, secured to said arm 1904, by-passes a shoulder on a retaining pawl 1907 free on a stud 1908 mounted in the plate 1396 (Fig. 3A). When the square stud 1906 by-passes the shoulder of the pawl 1907, a spring 1909, tensioned between said pawl and the plate 1912, causes the shoulder on said pawl to engage the stud to retain the arms 1904, 1898, and 1862 (Fig. 26) in their clockwise positions for a sufficient length of time for sensing mechanism to function.

After the sensing mechanism has functioned as explained above, to cause the line-spacing mechanism to operate, a link 1415 (Fig. 25) is shifted rearwardly, as explained in the co-pending application Serial No. 524,846, now United States Patent No. 2,442,402, causing a stud 1911 therein to engage a protruding surface on the forward edge of the arm 1907 and rock said arm clockwise against the action of the spring 1909. Clockwise movement of the arm 1907 disengages the shoulder on its upper end from the stud 1906 to free the plate 1912 and the arm 1904 to the action of the spring 1909, which immediately rocks said parts and the arms 1898 and 1862 and the sensing number 1828 counter-clockwise to normal position.

Release of the depressed control key 376 to 379 inclusive, or the depressed Correction key 369, permits the control plate 1760 (Fig. 25) to be spring-returned rearwardly, which, through the mechanism shown here, restores the arms 1898 and 1899 and connected mechanism downwardly to normal position.

Control of line-spacing by traveling carriage

A sensing lever 1925 (Figs. 5B and 11), in cooperation with corresponding tappets 1917 carried by control blocks 722 clamped on a control block bar 729 secured to the under side of the bottom plate 730 (Fig. 8), is arranged to control the automatic line-spacing movement of the platen roll 309, depending upon the columnar position of the traveling carriage.

The right-hand end of the sensing lever 1925 (Figs. 11 and 17) overlies a rearward extension of a lever 1991 free on a stationary stud 1964 and pivotally connected by a link 1992 to one arm of a bell crank 1993 free on a stud 1994 secured on the plate 1191 (Figs. 3B and 5B). A spring 2008 urges the lever 1991 counter-clockwise to normally maintain said lever in yielding engagement with the sensing lever 1925 (Fig. 5B). A downwardly-extending arm of the bell crank 1993 has pivotally connected thereto the rearward end of a link 1995, the forward end of which is slotted to receive a stud 1996 in a lever 1997 free on a stud 1422. A forward extension of the lever 1997 is provided with an arcuate slot which engages a stud 1998 in an arm 2000 having a slot which freely engages a hub of the lever 1728, said hub being free on the stud 161. The stud 1998 likewise extends through a slot 1999 in the lever 1728.

If the traveling carriage 136 is located in a columnar position in which no tappet 1917 is opposite a sensing projection 1931 of the lever 1925, said lever is free to move under influence of a spring-actuated mechanism upon the releasing of said lever 1925 for sensing movement. Sensing movement of the lever 1925 causes its right-hand extension to rock the lever 1991 clockwise, against the action of the spring 2008 (Fig. 17), which movement, through the link 1992 and the bell crank 1993, shifts the link 1995 forwardly, causing the slot in its forward end, in cooperation with the stud 1996, to rock the lever 1997 also clockwise. Clockwise movement of the lever 1997 causes the slot in its forward extension, in cooperation with the stud 1998, to shift said stud and the arm 2000 upwardly to engage said stud with a notch in a downward extension of the arm 1846 (Figs. 2, 17, and 23) to operatively connect the lever 1728 to said arm 1846 for the purpose that release of the actuator 1848 by the cam 1855, as explained earlier herein, immediately after printing has been effected, will cause the vertical feeding or line-spacing mechanism to become effective to rotate the platen roll 309 to line-space the record material wound therearound.

If the traveling carriage 136 is located in a columnar position in which one of the tappets 1917 (Fig. 11) is opposite the sensing projection 1931 of the lever 1925, sensing movement of said lever, as explained above, will be obstructed, and, as a result, the lever 1991 (Fig. 17) will be retained in the position shown here. Therefore no movement will be imparted to the lever 1997, and, as a result, the stud 1998 will remain out of engagement with the notch in the arm 1846 (Fig. 2). In this case, the line-spacing mechanism will not function.

When the main Release bar 170 (Figs. 3A and 3B) is fully depressed and is retained thus, a bar 1386 (Fig. 17) is shifted forwardly, as explained in co-pending application Serial No. 524,846, now United States Patent No. 2,442,402, to cause the traveling carriage to be moved to the No. 2 Check column. The bar 1386 has a bent-over extension 2001, which cooperates with an upward extension 2002 of a bar 2003 mounted for independent shifting movement on the link 1995 by means of a hole in its forward end, which freely engages the stud 1996, and by means of a slot in its rearward end, which embraces a stud 2004 in said bar 1995. A spring 2005, tensioned between the studs 2004 and 1996, urges the lever 1997 counter-clockwise and the bar 2003 rearwardly. Subsequent forward movement of the bar 1386, through the extensions 2001 and 2002 (Fig. 17), shifts the bar 2003 also forwardly against the action of the spring 2005, causing said bar to rock the lever 1997 clockwise in the manner explained previously to engage the stud 1998 (Fig. 2) with a notch in the arm 1846 to cause the platen roll 309 to be revolved to line-space the record material supported thereby, in exactly the same manner as explained previously.

MODE OF OPERATION

The machine embodying the present invention has been arranged for use by banking establishments in the balancing of individual checking accounts. However, this is but a representative use of this machine, as its versatility and its many features make it easily adaptable for use in connection with many different business systems; therefore it is not desired to limit the machine to any one business system or to any particular use in connection with such systems.

The statement slip 1550, shown in Fig. 19, will be used as a basis in explaining one mode of operating the machine, said statement slip being for one individual checking account and issued in the name of John Doe, in account with Any Bank and Trust Company, Anywhere.

It will be noted that the statement slip is divided into a main portion and a stub portion, said portions being divided by perforations to facilitate their separation.

The main portion of the statement slip is divided into the following columns—a Pick-Up column, three Check columns, a Deposit column, and a Sub-Balance column. In addition, the main portion of the statement slip contains two Date columns, one of which is between the Pick-Up column and the first Check column and the other of which is between the Deposit column and the Sub-Balance column, in which columns the dates are printed in connection with the recording of the first check item and the recording of the sub-balance.

The stub portion of the statement slip contains a Float column, in which the analysis of the float is recorded; a Date column; a Total Item column; and a Balance column. The Date and the Total Items are printed in connection with the recording of the balance in the Balance column.

In the right-hand upper margin of the main portion of the statement slip, definitions of the symbol keys 390 when used in connection with debit and/or credit items are listed.

In most banking establishments, it is the general practice to balance each active checking account daily, and the statement slips used in balancing such active accounts are usually of sufficient length for accommodating all of the entries over a certain period of time, usually a month, at the end of which time the stub portion of the statement slip is separated from its main portion, the main portion being mailed to the depositor or customer and the stub portion being retained by the bank as a record.

Before the beginning of the daily posting of active checking accounts, the operator properly inserts a journal sheet with its superimposed carbon paper around the platen roll 309 (Fig. 1), said journal sheet being the full width of both the main portion and the stub portion of the statement slips for the reception of a duplicate recording of every entry made on the statement slips during the day's run.

Prior to the posting of individual checking accounts, all of the active statement slips are removed from the file and placed in a convenient stack or pile near the operator in alphabetical order. With the traveling carriage 136 (Fig. 1) in its extreme right-hand or Pick-Up columnar position and with the platen roll 309 in open throat position, the operator removes the statement slip 1550 (Fig. 19) for John Doe from the top of the stack, places it in the open throat of the traveling carriage, locates the proper line of the statement slip with the printing mechanism by means of the line-finding device, and then operates the electrical switch, which starts the motor for the traveling carriage and the machine proper.

If this is the first entry to be made on John Doe's statement slip, the operator ascertains the old balance of $500.00 from the last entry on the stub portion of his previous statement slip and sets up said old balance of $500.00 on amount keys 218, depression of which amount keys causes the platen roll 309 to be moved from open throat position to printing position.

After the amount of the old balance, $500.00, has been set up on the amount keys, operation of the machine is initiated by normal depression of the main Release bar 170, during which operation the amount of the previous or old balance is recorded in the Pick-Up column of the statement slip and is simultaneously added into the previously cleared No. 1 or balance totalizer. Normal depression of the Release bar 170 causes the traveling carriage to be tabulated from the Pick-Up column to the next columnar position—that is, the first Check column—at the end of machine operation. Next, the operator sets up the amount of the first check item ($50.00) on the amount keys and, to identify this as a "debit memo," depresses the DM symbol key 390, after which operation of the machine is initiated by normal depression of the main Release bar 170. During operation of the machine, the amount of the first check, $50.00, is recorded in red in the first Check column, and the "DM" symbol is simultaneously recorded immediately to its right. At the same time, the amount of the check is subtracted from the balance of $500.00 in the balance totalizer.

At the end of the first check posting operation, the traveling carriage 136 tabulates automatically to the second Check column, and the amount of the second check ($125.00) is set up on the amount keys and the machine is again released for operation by normal depression of the Release bar 170. During this second check operation, the amount of the check ($125.00) is subtracted from the balance totalizer and is simultaneously recorded in red in the second Check column. At the end of this operation, the traveling carriage again tabulates automatically one columnar position to the third Check column.

With the traveling carriage in the third Check columnar position, the amount of the third Check ($75.00) is set up on the amount keys, and, as there is one more debit or check item to be posted, the operator initiates operation by normal depression of the Vertical Feed bar 171. During this operation of the machine, the third check item ($75.00) is recorded in red in the third Check column and is simultaneously subtracted from the No. 1 or balance totalizer. At the end of the operation, the platen roll is rotated to line-space the record material in preparation for the entry of the fourth check item.

Next, the amount of the fourth check item ($50.00) is set up on the amount keys, and the machine is released for operation by normal depression of the Release bar 170. During this operation, the amount of the fourth check item ($50.00) is recorded in red in the third Check column, directly beneath the third check item, and is simultaneously subtracted from the balance totalizer. Near the end of machine operation, the traveling carriage 136 tabulates to the next or Deposit columnar position.

With the traveling carriage 136 in the Deposit columnar position, the amount of the deposit ($100.00) is set up on the amount keys, and the machine is released for operation by normal depression of the Release bar 170. During operation of the machine, the amount of the deposit ($100.00) is recorded in black in the Deposit column of the statement slip and is simultaneously added in the balance totalizer.

Near the end of the deposit operation, the traveling carriage 136 tabulates automatically to the next or Sub-Balance column, in which an automatic operation of the machine is initiated by said traveling carriage. In this automatic operation, the balance totalizer is sub-totalized, and the sub-balance of $300.00 is recorded in black in the Sub-Balance column. The sub-balance is identified as such by the symbol "*S," which is automatically printed at the time the sub-balance is printed. At the end of the sub-balance operation, the traveling carriage tabulates automatically to the Float columnar position.

With the traveling carriage located in the Float columnar position, the operator depresses the proper amount keys and initiates machine operation by normal depression of the Release bar 170. Upon operation of the machine, an analysis of the float is recorded in the Float column, and during this operation all of the totalizers are automatically non-added so that the machine will function at this time only as a printing machine.

At the end of the float operation, the traveling carriage tabulates automatically to the Balance column and, upon arrival in this position, said carriage initiates an automatic operation, during which the balance totalizer is totalized and the amount therein ($300.00) is recorded in black in the Balance column of the statement slip 1550, and simultaneously therewith the identifying symbol "*" is printed directly opposite said amount to identify it as a positive balance and the item totalizer is totalized to record the total number of items, in this case five, in the Total Item column immediately to the left of the recording of the balance.

Near the end of the balance operation, the traveling carriage 136 (Fig. 1) tabulates automatically a slight distance beyond the Balance columnar position to render effective mechanism which causes said carriage to be moved in a return direction to the Pick-Up column and at the same time causes the platen roll 309 to be moved from printing position to open throat position, so that the statement slip may be readily removed and the next statement slip inserted in the front-feed throat of the machine. In all other columnar positions of the traveling carriage, the automatic throat opening mechanism is automatically locked against operation to avoid unnecessary opening and closing of the front-feed throat.

In posting John Doe's account for the succeeding days in April, as shown on the sample form in Fig. 19, a similar procedure is followed, although minor variations are made therein in each case in order to take care of the particular items involved in that day's transactions.

It is believed that the above description of operation in connection with one particular business system will be sufficient for the purpose of the present specification. However, the many features and the versatility of the machine embodying this invention render it readily adaptable for use in connection with almost any type of business system used in connection with present-day business and manufacturing establishments.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described having a frame, and a platen roll for supporting record material, said platen roll movable from a printing position to a front feed position and vice versa, the combination of means for moving said platen roll from printing position to front feed position and vice versa; a ratchet secured to said platen roll; a feed pawl cooperating with said ratchet to rotate said platen roll and linespace the record material; an adjustable member cooperating with said pawl for controlling the amount of movement given to said platen roll by said pawl; a manipulable element mounted on the machine frame and connected with said member for adjusting the latter; and means movable with said platen roll as the latter is moved from printing position to front feed position and vice versa to retain said member in the position to which it has been adjusted by said manipulable element.

2. In a machine of the class described having a frame, and a platen roll, constructed and arranged to support record material, said platen roll movable from a printing position to a front feed position, the combination of means for moving said platen roll from printing position to front feed position and vice versa; a ratchet secured to said platen roll; a feed pawl engageable with said ratchet to rotate said platen roll and line-space the record material; normally stationary means mounted in the machine frame for operating said pawl; means operably connecting said operating means with said pawl, said means causing said pawl to be operated when said platen roll is moved from printing position to front feed position and vice versa; and means cooperating with said pawl for preventing the latter from engaging with said ratchet and thereby rotating said platen roll, as said roll moves from printing position to front feed position and vice versa.

3. In a machine of the class described having means to release the machine for operation and a platen roll for supporting record material, the combination of means to rotate the platen roll to line-space the record material; means, including a cam, for operating the rotating means; power means; means, including a clutch, to connect said cam to said power means for operation thereby, said clutch being normally disengaged; means to engage said clutch; means operated on each operation of the machine for actuating said engaging means; and means operated by said machine releasing means for causing said engaging means to be connected with said actuating means to thereby cause the platen roll to be rotated to line-space the record material.

4. In a machine of the class described having means to release the machine for operation, a traveling paper carriage movable to various columnar positions, and a platen roll on said carriage for supporting record material, the combination of means to rotate the platen roll to line-space the record material; means, including a cam, for operating the rotating means; power means; means, comprising a clutch, for connecting said cam with said power means for operation thereby, said clutch being normally disengaged; means to engage said clutch; means operated on each operation of the machine for actuating said engaging means; and means operable by said machine releasing means and also by said traveling paper carriage in preselected columnar positions thereof for causing said engaging means to be connected with said actuating means so as to cause the platen roll to be rotated to line-space the record material.

5. In a machine of the class described having a traveling paper carriage movable to various columnar positions and a platen roll on said carriage for supporting record material, the combination of means to rotate said platen roll to line-space the record material; means, comprising a cam, for operating said rotating means; power means; a clutch for connecting said cam to said power means; means to engage said clutch; means operated on each operation of the machine for actuating said engaging means; and means controlled by the traveling paper carriage in preselected columnar positions thereof for causing said engaging means to be connected with said actuating means so as to cause the platen roll to be rotated to line-space the record material.

6. In a machine of the class described having means to release the machine for operation and a platen roll on the machine for supporting record material, the combination of means to rotate the platen roll to line-space the record material; means, including a cam, for operating said rotating means; power means; a clutch for connecting said cam to said power means for operation thereby, said clutch being normally disengaged; means for engaging said clutch; actuating means for operating said engaging means; and means, including a sensing mechanism, for causing the machine releasing means to connect said engaging means to said actuating means for operation thereby so as to cause the platen roll to be rotated to line-space the record material.

7. In a machine of the class described having manipulative means for initiating cycles of operation of the machine and a platen roll on the machine for supporting record material, the combination of means for rotating the platen roll to line-space the record material, said means including a power shaft, a cam, and a clutch for connecting said cam to said power shaft; means for engaging said clutch; actuating means for operating said engaging means; a manipulable control member; a sensing device movable by said manipulative means into engagement with said control member, said device being adapted to be held stationary or rocked to an effective position when brought into engagement with said control member; and means operated by said sensing device when rocked to effective position for causing said engaging means to be connected with said actuating means to thereby cause the platen roll to be rotated to line-space the record material.

8. In a machine of the class described having a platen roll for supporting record material, the combination of means to rotate the platen roll to line-space the record material; power means; means for engaging said power means with said rotating means; an actuator operated on each operation of the machine; means for connecting said actuator with said engaging means; a normally ineffective, power-operated means for operating said connecting means; and manipulative devices for rendering said power-operated means effective to operate said connecting means to thereby cause the platen roll to be rotated to line-space the record material.

9. In a machine of the class described having means for giving the machine cycles of operation, manipulative devices for initiating operation of said cycling means, and a platen roll for supporting record material, the combination of means for rotating the platen roll so as to line-space the record material; power means; means for engaging said power means with said rotating means; an actuator operated on each operation of the machine; means for connecting said actuator with said engaging means; a normally inactive and ineffective operating device for operating said connecting means; means controlled by any one of said manipulative devices for rendering said device active; and additional means controlled by said manipulative devices for rendering said device effective to operate said connecting means and thereby cause the platen roll to be rotated to line-space the record material.

10. In a machine of the class described having means for giving the machine cycles of operation, manipulative means for initiating operation of said cycling means, said manipulative means having a partially depressed position and a fully depressed position, and a platen roll for supporting record material, the combination of means for rotating the platen roll to line-space the record material; means for actuating the rotating means; power means; normally ineffective means for connecting said actuating means with said power means; and means, including a sensing device, for causing said connecting means to be rendered effective, when the manipulative means is moved to its partially depressed position, so as to cause the platen roll to be rotated to line-space the record material, and means for disabling said sensing device when said manipulative means is moved to its fully depressed position so as to prevent the platen roll from being rotated to line-space the record material.

11. In a machine of the class described, having means to release the machine for operation and a traveling carriage, said carriage having a platen roll for supporting record material, the combination of means to rotate the platen roll to line-space the record material; means to actuate the rotating means; power means; means to connect the actuating means to the power means for operation thereby; means to render the connecting means effective to cause the platen to be rotated to line-space the record material; manipulative means to actuate the rendering means; other means to actuate the rendering means, said other means normally ineffective; and means whereby the machine releasing means effectuates the other actuating means to cause the platen to be rotated to line-space the record material.

12. In a machine of the class described, having means to release the machine for operation, and a traveling carriage, said carriage having a platen roll for supporting record material, the combination of means to rotate the platen roll to line-space the record material; means, including a cam, to actuate the rotating means; power means; means, including a clutch mechanism, to connect said cam to the power means for operation thereby, said clutch mechanism being normally disengaged; means to engage the clutch mechanism; means effective during machine operation to actuate the engaging means; means whereby the machine releasing means connects the engaging means to the latter actuating means to cause the platen roll to be rotated to line-space the record material; and means effective after the platen roll has been rotated to disengage the clutch mechanism.

13. In a machine of the class described, having means to release the machine for operation and a traveling carriage movable to various columnar positions, said carriage having a platen roll to support record material, the combination of means to rotate the platen to line-space the record material; means, comprising a cam, to actuate the rotating means; power means; means, comprising a clutch mechanism connected to the power means and engageable with the cam, to connect the cam to said power means for operation thereby, said clutch mechanism being normally disengaged; means to engage the clutch mechanism; means effective during machine operation to actuate the engaging means; means adapted to be operated either by the machine releasing means or by the traveling carriage in preselected columnar positions thereof to connect the engaging means to the latter actuating means to cause the platen roll to be rotated to line-space the record material; and means to disengage the clutch mechanism after the record material has been line-spaced.

14. In a machine of the class described, having a traveling carriage movable to various columnar positions, said carriage having a platen roll to support record material, the combination of means to rotate the platen roll to line-space the record material; means, comprising a cam, to actuate the rotating means; power means; a clutch mechanism connected to the power means and engageable with the cam to connect the cam to said power means; means to engage the clutch mechanism with the cam; means effective during machine operation to actuate the engaging means; means to connect the engaging means to the actuating means; means operated by the traveling carriage in preselected columnar positions thereof to effectuate the connecting means to cause the platen to be rotated to line-space the record material; and means effective after the platen has been rotated to disengage the clutch mechanism from the cam.

15. In a machine of the class described, having a traveling carriage movable to various columnar positions, said carriage having a platen roll for record material, the combination of means to rotate the platen roll to line-space the record material; means, comprising a cam, to actuate the rotating means; power means; a clutch mechanism connected to the power means and engageable with the cam to connect the cam to said power means; means to engage the clutch mechanism with the cam; means effective during machine operation to actuate the engaging means; means to connect the engaging means to the actuating means; control elements on the traveling carriage corresponding to the various columnar positions thereof; means cooperating with the control elements to locate the carriage in any of its various columnar positions; means, including projections on the control elements and mechanism cooperating therewith, to effectuate the connecting means to cause the platen to be rotated to line-space the record material; and means effective after the platen has been rotated to disengage the clutch mechanism from the cam.

JOHN T. DAVIDSON.
JESSE R. GANGER.
JAMES H. CRAWFORD.
HERMAN F. SADGEBURY.

REFERENCES CITED

The following references are of record in the file of this patent:

UNITED STATES PATENTS

| Number | Name | Date |
|---|---|---|
| 1,066,083 | Cook | July 1, 1913 |
| 1,283,596 | Thieme | Nov. 5, 1918 |
| 2,082,098 | Christian | June 1, 1937 |
| 2,138,482 | Davidson | Nov. 29, 1938 |